US012756579B2

(12) United States Patent
Falko et al.

(10) Patent No.: US 12,756,579 B2
(45) Date of Patent: Oct. 6, 2026

(54) SECURING SECRETS IN SOFTWARE BUILD WORKFLOWS INVOLVING MODULAR BUILD CODE

(71) Applicant: Salesforce, Inc., San Francisco, CA (US)

(72) Inventors: Andrey Falko, San Francisco, CA (US); Thomas Page Odom, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 247 days.

(21) Appl. No.: 18/428,951

(22) Filed: Jan. 31, 2024

(65) Prior Publication Data

US 2025/0247247 A1 Jul. 31, 2025

(51) Int. Cl.
*H04L 9/32* (2006.01)
*G06F 8/77* (2018.01)
*G06F 21/44* (2013.01)

(52) U.S. Cl.
CPC .............. *H04L 9/3247* (2013.01); *G06F 8/77* (2013.01); *G06F 21/44* (2013.01)

(58) Field of Classification Search
CPC ........... H04L 9/3247; G06F 8/77; G06F 21/44
See application file for complete search history.

(56) References Cited

U.S. PATENT DOCUMENTS 10,581,833 B2 * 3/2020 Kim ........................ G06F 21/62
2007/0011723 A1 * 1/2007 Chao ....................... G06F 21/53 726/4
2019/0095622 A1 * 3/2019 Brumlow .................. G06F 8/71

FOREIGN PATENT DOCUMENTS

EP 4432145 A1 * 9/2024 ............. G06F 21/57
EP 4557136 A1 * 5/2025 ............. G06F 21/74

OTHER PUBLICATIONS

GitHub Actions, "Creating a Composite Action," GitHub Docs, pp. 1-5. (https://docs.github.com/en/actions/creating-actions/creating-a-composite-action).
GitHub CLI, "Using Secrets in GitHub Actions," GitHub Docs, pp. 1-12.(https://docs.github.com/en/actions/security-guides/using-secrets-in-github-actions).

* cited by examiner

*Primary Examiner* — Nicholas P Celani
(74) *Attorney, Agent, or Firm* — Weaver Austin Villeneuve & Sampson LLP

(57) ABSTRACT

Techniques are described for securing secrets in software build workflows. In some implementations, build instructions call for execution of a first program module and a second program module, where the first program module has been approved to make a privileged request, but the second program module has not. The first program module can be stored in a trusted repository, separately from the second program module. When the first program module is loaded for execution, a cryptographic signature can be validated to determine that the first program module is authentic and as a condition for passing a privileged credential to the first program module. The second program module has no access to the privileged credential. Instead, when the second program module is loaded for execution, a determination can be made whether the second program module makes any privileged requests. Any privileged requests from the second program module will not be fulfilled.

20 Claims, 9 Drawing Sheets

SECURING SECRETS IN SOFTWARE BUILD WORKFLOWS INVOLVING MODULAR BUILD CODE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to managing the build process for software under development, more particularly, to loading and executing program modules that implement different parts of a software build workflow. The present disclosure also relates to mechanisms for allowing program modules that have been approved to make privileged requests to access privileged credentials in connection with build operations while, at the same time, disallowing access by program modules that have not been approved to make privileged requests.

BACKGROUND

A modern software development lifecycle usually involves several phases including planning, design, testing, and deployment. Some of the activities occurring during these phases correspond to a build process. The build process may involve activities such as compiling source code into a machine-readable (e.g., binary) format, testing the compiled code, and combining different pieces of a software package (compiled code, libraries, configuration files, documentation, etc.) into a deliverable, production-ready artifact.

During the build process, software development teams may work on different parts of a software application, with each part being subjected to similar build steps including, for example, compilation and testing. When it comes time to move the software application into production, access to one or more production systems may be limited to a small subset of developers who have been granted permission to view or modify the contents of the production systems, e.g., the ability to upload a package to a production server. Access to the production systems may be controlled through privileged credentials, which are generally kept secret and known only to certain users. Limiting access to privileged credentials helps to reduce the risk of the production systems becoming compromised, e.g., through theft of source code or introduction of malware. A pertinent example of this is when a malicious user, through social engineering and/or technical means, bypasses or circumvents security checks put in place to protect the production systems. However, limiting access to privileged credentials would also prevent a user who lacks such credentials from executing build code that involves accessing the production systems, even if the user has permission to perform other build steps that don't involve the production systems.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAILED DESCRIPTION

Figure 1:
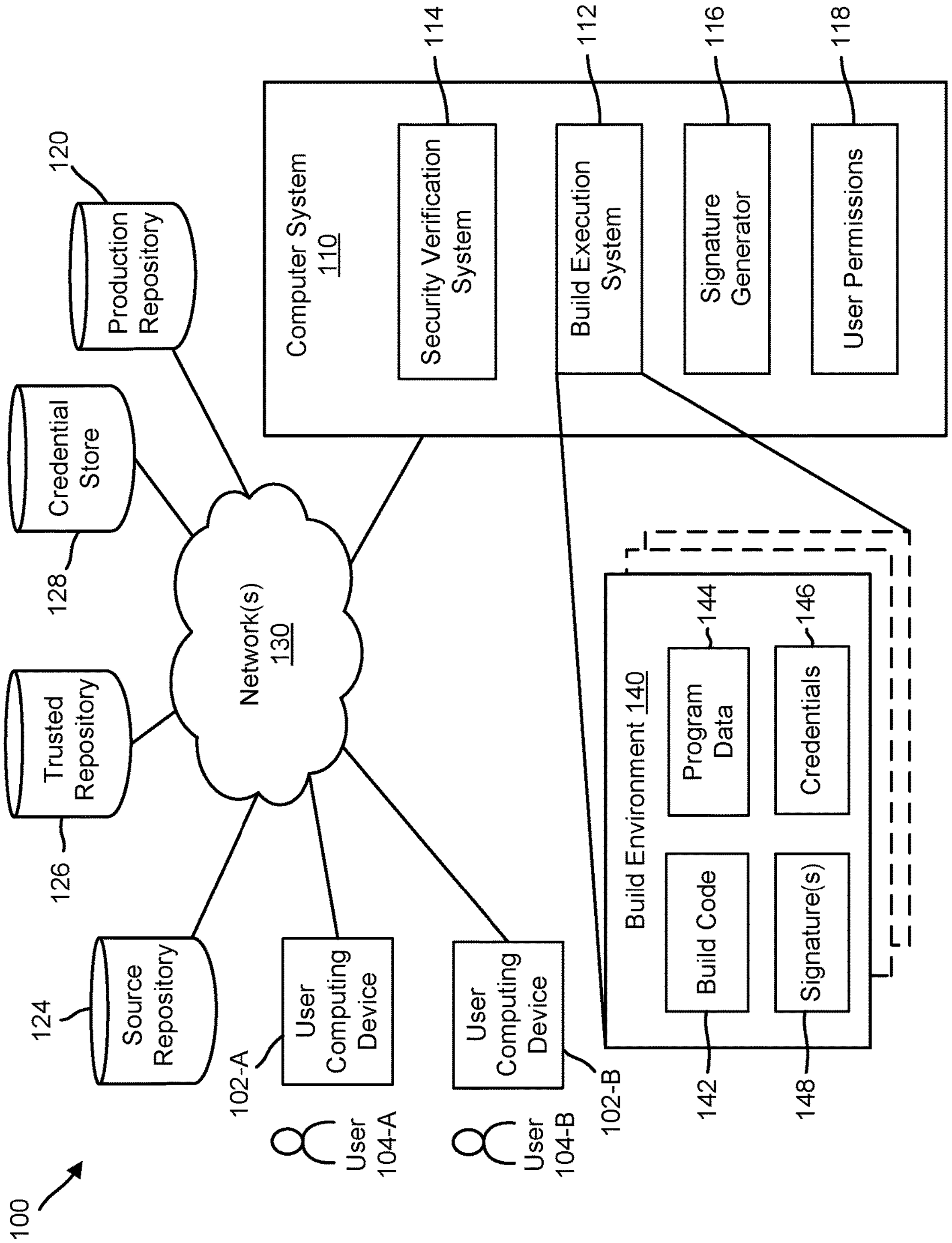
FIG. 1 is a diagram of an example computing environment incorporating one or more implementations.

Examples of techniques for securing secrets in software build workflows while, at the same time, allowing program code to be shared and reused by users having different access permissions are described herein with reference to certain implementations. In particular, aspects of the present disclosure are directed to preventing credentials used to access a software production system from being viewed or otherwise accessed by users to whom the credentials do not belong, during execution of build instructions that employ program modules associated with those users. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

The described subject matter may be implemented in the context of a computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer-readable medium such as a non-transitory computer-readable storage medium containing computer-readable instructions or computer program code, or as a computer program product comprising a computer usable medium having a computer-readable program code embodied therein.

A build process can include a set of related operations performed with respect to software under development, leading up to and including publication of a finished software product to a production system for deployment, e.g., as a downloadable program, a web application, or through physical storage media such as compact discs (CDs) or digital versatile disk (DVDs). These related operations can be considered distinct sub-operations that make up an overall build operation and can include compilation, testing, packaging, production publication, and the like. Each sub-operation may include one or more computer-implemented steps that are defined programmatically, e.g., a file containing build instructions written in a high-level programming language. In some instances, the steps forming a build process are executed as jobs running in parallel or sequentially. Multiple jobs, possibly spread across different sub-operations, may form an automated workflow that can be scheduled for execution or triggered manually.

Build instructions may be encoded in a specific workflow definition format depending on the computing platform. Examples of computing platforms that support build workflows include Salesforce Continuous Integration Executor (CIX), GitHub Actions, Argo Workflows, and Temporal. Salesforce CIX is a workflow execution engine for a Continuous Integration (CI) service available from Salesforce, Inc. of San Francisco, CA. GitHub Actions is a CI platform provided by GitHub, Inc. of San Francisco, CA. Argo Workflows is an open-source workflow execution engine for Kubernetes. Temporal is an open-source workflow execution engine from Temporal Technologies Inc. of Bellevue, WA.

Since a build process can include steps that access a production system, a workflow execution engine will typically disallow execution of build instructions that call for access to the production system unless the user (e.g., the author of the build instructions) is able to present credentials needed to access the production system. Further, build instructions may be manually reviewed by a security team against an organization's security policy before being permitted to be executed. For example, build instructions that have been deemed to meet security requirements may be placed in a centralized and trusted repository from which the build instructions are retrieved for execution. In practice, this means that requests to execute workflows not found in the centralized/trusted repository will be ignored or denied, even if the request is from a user with knowledge of the credentials needed to access the production system. Thus, a user who wants to define a custom workflow would be unable to execute the custom workflow unless the corresponding code has been reviewed and deposited into the centralized repository. This can be detrimental to productivity since code from another user is not always suitable for a user's own needs.

As discussed in further detail below, various mechanisms can be implemented to enable users to author custom sub-workflows that are injected into centralized workflows as program modules in a trusted repository. Further, techniques are described for enabling users to share these custom sub-workflows with other users so that the other users do not have to go through the trouble of adding their own custom sub-workflows to the trusted repository. Users can even share sub-workflows that exist outside the trusted repository. This increases user productivity in two ways: 1) in the case of the trusted repository, users are able to create shareable sub-workflows without going through review with an administrator of the trusted repository, and 2) in the case of a non-trusted repository, users are able to use or reuse sub-workflows that don't require production system access.

In order to support extension points outside of the trusted repository, security measures should be established to prevent misuse of privileges, especially in the case of a user without production access. One solution for enabling custom workflows outside the trusted repository is to allow execution of workflows that combine user-configured steps with steps imported from the trusted repository. However, since the steps from the trusted repository often use production system credentials, this may require passing the credentials into the steps at execution time, creating an opportunity for other parts of the workflow (e.g., custom steps from outside the trusted repository) to gain access to the credentials. In fact, a malicious user might even attempt to disguise their own code as corresponding to a step from the trusted repository, thereby tricking the execution engine into disclosing any credentials associated with that step. These and other challenges to maintaining security in build workflows are addressed in various illustrative examples set forth below.

In the example implementations described below, information processed by a computer system to provide the functionality disclosed herein can be organized as data structures that are stored, for example, in memory or in one or more databases. Examples of such data structures, which can be arranged as database records or data objects, are provided for illustration purposes only. One skilled in the art will understand that the information in the data structures can be organized in different ways, including combining or splitting of data structures so that the information is stored in a more collected or distributed fashion.

The disclosed implementations may include a computer-implemented method including obtaining, by a computer system, a set of build instructions calling for execution of a first program module stored in a trusted repository in addition to execution of a second program module not stored in the trusted repository. The first program module and the second program module are executable to perform build operations for software under development. The trusted repository stores program modules that have been approved to make privileged requests using one or more privileged credentials. The method may further include loading the first program module and the second program module for execution. Loading the first program module may involve validating, by the computer system, a cryptographic signature of the first program module to determine that the first program module is authentic, and passing, by the computer system, a privileged credential to the first program module without providing the second program module access to the privileged credential, where the passing of the privileged credential is conditioned upon successful validation of the cryptographic signature. Loading the second program module may involve determining, by the computer system, whether the second program module makes any privileged requests, and preventing fulfillment of any privileged requests from the second program module.

The disclosed implementations may include a computer system with one or more processors and a trusted repository storing program modules that have been approved to make privileged requests using one or more privileged credentials. The one or more processors are configured, e.g., through instructions stored in a memory of the computer system, to obtain a set of build instructions calling for execution of a first program module stored in the trusted repository in addition to execution of a second program module not stored in the trusted repository. The one or more processors are further configured to load the first program module and the second program module for execution. To load the first program module, the one or more processors may validate a cryptographic signature of the first program module to determine that the first program module is authentic, and to pass a privileged credential to the first program module without providing the second program module access to the privileged credential, where the passing of the privileged credential is conditioned upon successful validation of the cryptographic signature. To load the second program module, the one or more processors may be configured to determine whether the second program module makes any privileged requests, and to prevent fulfillment of any privileged requests from the second program module.

The disclosed implementations may include a non-transitory computer-readable medium storing program code, the program code including instructions that are executable by one or more processors of a computer system to configure the computer system to perform any of the methods disclosed herein.

Any of the disclosed implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1 is a diagram of an example computing environment 100 incorporating one or more implementations. The environment 100 includes a computer system 110 and user computing devices 102 operated by various users 104. The number of users can vary. For simplicity, FIG. 1 shows only two users, a first user 104-A and a second user 104-B operating a computing device 102-A and a computing device 102-B, respectively. Aspects of the present disclosure relate to providing users with different access privileges the ability to create and execute custom workflows as part of a build process. For example, the user 104-A may have been assigned credentials (e.g., a username and password) that enable the user 104-A to access a software production system including a production repository 120, while the user 104-B may have no access to the production system. In the context of creating a software product, this can occur, for example, when the user 104-A is a member of a different design team than the user 104-B. In some instances, the users 104-A and 104-B may belong to different organizations, e.g., two companies tasked with creating different portions of a larger program or software suite. Other situations exist where some users have the ability to access a production system and other users do not. FIG. 1 shows a single production repository. However, the computing environment 100 can include multiple production repositories and/or multiple production systems. For example, a set of software applications may be deployed on a cloud computing platform with physical or virtual machines. The physical or machines can be organized in groups (e.g., pod clusters), where each group may correspond to one or more production systems on which a subset of applications is stored and/or executed.

Computing environment 100 can be a distributed environment in which data is stored across different datastores or repositories. For example, besides the production repository 120, the computing environment 100 may include a source repository 124, a trusted repository 126, and a credential store 128. These storage elements may provide for logical and/or physical separation of data. For example, the source repository 124 and the trusted repository 126 may correspond to different databases hosted on the same computer server or be located on different servers. Further, the production repository 120 and the credential store 128 may be on different servers separate from the server(s) hosting the repositories 124 and 126. There can be any number of entities responsible for operating the storage elements. For instance, the source repository 124 and the trusted repository 126 can be managed by different organizations. The operator of the trusted repository 126 can, for example, be a service provider that also operates the computer system 110. By contrast, the operator of the source repository 124 could be a vendor providing off-site storage for users associated with the computer system 110 (e.g., the users 104-A and 104B).

Communications within the computing environment 100 may occur over one or more networks 130. The network(s) 130 can include wired and/or wireless networks and may be implemented as a private network (e.g., a local area network or private area network), a public network (e.g., the Internet), or a combination of private and public networks. A user 104 may access one or more of the above-mentioned storage elements through the network(s) 130 in accordance with their assigned permissions. Depending on implementation, a user 104 may access one or more storage elements directly using their computing device 102 or, in some instances, through the computer system 110. For example, the user 104-A may log into the trusted repository 126 through a web portal, using their username and password, to view source code authored by the user 104-A. Some repositories may be accessed based on the same credentials. For example, the source repository 124 and the trusted repository 126 may be accessible using a single sign-on (SSO) mechanism, whereby a user 104 logs into the computer system 110 using one set of credentials to access the source repository 124 and the trusted repository 126 via an SSO session without having to re-authenticate with each of the repositories.

Access permissions can be configured for a user at the repository level so that the user is able to perform actions on the repository commensurate with the scope of their configured permissions. For example, the user 104-A may have the ability to read some or all the contents of the trusted repository 126, but no ability to modify the contents. In some cases, both the user 104-A and the user 104-B have write access (e.g., upload permission) to the source repository 124, but only one of these users (e.g., the user 104-A) can request that data be uploaded to the trusted repository 126. For example, as discussed in further detail below, a user with permission to update the contents of the trusted repository 126 may submit a request to the computer system 110 for publishing code to the trusted repository 126.

Credentials can be associated with individual users and/or user groups. For example, in additional to having a personal username and password, the user 104-A may be associated with a group account shared with other members of the user's team. In some instances, credentials may be stored on behalf of a user. For example, the credential store 128 may store a group identifier (ID) along with a corresponding password, where the group ID is associated with the team that user 104-A belongs to. The group ID and password may provide access to the production repository 120, but the user 104-A need not directly present the group ID and password to the production repository for access. Instead, the computer system 110 may retrieve the group ID and/or password from the credential store 128, e.g., in response to an access request from the user 104-A and after authenticating the user 104-A based on their personal username and password. In fact, the user 104-A may not even know what the credential (s) stored on their behalf are. As discussed below, automated retrieval of stored credentials can occur during a build operation, since the stored credentials may be required in order for certain steps or sub-operations to access the production system. During a build operation, the access requests may be triggered through execution of build instructions instead of coming directly from a user.

Source repository 124 is configured to store source code, build instructions, and/or other data supplied by a user 104. The source code may contain program instructions for software under development. The source repository 124 can also store other data associated with a software application being developed, such as libraries, digital assets (e.g., images or audio files), metadata (e.g., user guides or other documentation), and/or the like. In order to distinguish source code and other data associated with software being developed (i.e., program data) from instructions that define build operations to be performed with respect to program data, build instructions are also referred to herein as "build code."

In practice, build code may be embodied as one or more files supplied by a user 104 for use with program data (e.g., source code). For example, a user may create a YAML-formatted file containing a list of build instructions (e.g., a shell script with a sequence of shell commands). YAML is a human-readable data serialization language sometimes used to create configuration files for software applications. To execute the build instructions in a YAML file, the file contents can be parsed to convert the build instructions into corresponding data structures and operations (e.g., Java objects) suitable for the execution environment.

The source repository 124 may operate as a storage space for users to maintain files relevant to the software being developed and, optionally, for collaboration between users. Visibility of data in the source repository 124 can be configured administratively. The source repository 124 may include public data shared between all users with access to the source repository 124. Alternatively or additionally, the source repository 124 may include private data visible to a particular user or user group (e.g., a file folder for a software development team).

Trusted repository 126 is configured to store build code that has been reviewed for security compliance. Optionally, the trusted repository 126 may further be configured to store source code or other program data. Access to the trusted repository 126 may be restricted in comparison to the source repository 124. In order to access the contents of the trusted repository 126 (e.g., to add, view, or modify files), a user 104 may be required to authenticate themselves and submit any requested changes for administrative approval. For example, a user 104 may submit a request to upload source code or build code from their computing device 102 to the trusted repository. The request may be processed by the computer system 110, which can temporarily hold the code in quarantine until the code has been reviewed for security compliance, e.g., manual review by a member of a security team to confirm that the code does not make inappropriate use of secrets/credentials. Likewise, a user 104 may request that source or build code currently stored in the source repository 124 be published to the trusted repository 126, subject to security review.

The trusted repository 126 may operate as a centralized source of trusted data for input to a build operation. Since the data in the trusted repository 126 has been reviewed (e.g., manually or through automated security checks), the build operation can be performed with assurance that there is a low risk of compromising the security or integrity of the production repository 120. The data in the trusted repository 126 may also include modular code shared between users 104. Modular code is reusable and can, for example, include build code defining operations frequently performed by users with respect to their own program data (e.g., typical compilation steps). By executing build code from the trusted repository 126, a user without production access may still be able to perform a build operation that accesses the production system (e.g., publishing compiled code to the production repository 120).

In some instances, build instructions to be executed may include instructions residing outside the trusted repository 126. For example, a user 104 may create a build file containing custom instructions for one or more steps of a build operation. In a traditional build environment, the user would need to have production access in order to execute any instructions involving access to the production system. Further, such instructions would be reviewed for security compliance before being allowed to execute. To support build code external to the trusted repository 126, one solution is to permit external build code to invoke instructions from the trusted repository 126 for any steps that access the production system. Thus, build code may be a composite of custom steps authored by a user and predefined steps (e.g., modular build code) from the trusted repository 126.

Security concerns can be addressed in several ways which will be described in more detail below with reference to illustrative examples. For instance, one option for enhancing security is to limit the use of external build code to code residing in the source repository 124 (or similar non-trusted repositories) and to subject such code to an automated security check before the code is permitted to be placed in the source repository 124. An automated security check may also be applied to code being placed in the trusted repository 126. Additionally, to ensure that the contents of the source repository 124 or the trusted repository 126 are authentic, a cryptographic signature may be generated for each content item (e.g., a build file) at the time of upload/storage. The cryptographic signature can be verified at runtime to confirm that the build code being executed is the same as that which was originally stored in the repository.

Credential store 128 is configured to maintain copies of credentials required for accessing the production system. For instance, the credential store 128 may store usernames, passwords, and/or other secrets that provide different levels of access to the production repository 120. In some implementations, the credential store 128 is the only place such credentials are stored, with no copies of the credentials existing outside the credential store. To protect against unauthorized disclosure, the credentials can be stored in an encrypted format, and user access to the credential store 128 may be disallowed. For example, the users 104 may have no visibility, and only the computer system 110 may be permitted to read from or write to the credential store 128.

Computer system 110 may include a build execution system 112 configured to perform build operations using the data in the source repository 124, the trusted repository 126, and the credential store 128. The build execution system 112 can execute build code on-demand based on a user request. Alternatively, a user 104 may configure event triggers to execute build code in response to certain events, such as when new source code is published to the source repository 124. In some instances, build code may be scheduled for repeated execution, e.g., applied at regular intervals to the most recent batch of source code.

The build execution system 112 can provide a separate build environment 140 for each instance of a build operation. The build environment 140 is an environment in which build code 142 can be executed using program data 144 specified by a user 104. For example, a user 104 may submit a request to execute the build code 142, and the request may identify a location (e.g., file path) where program data 144 is stored (e.g., in the source repository 124). In some instances, the location of the program data 144 may be identified in the build code 142.

The build environment 140 can be containerized to include one or more logical containers that provide isolation or "sandboxing" between different parts of the build code 142 (e.g., program modules that implement different steps). Isolation may involve allocating separate resources (e.g., memory or processing capabilities) to each container and restricting data flow by disallowing sharing of data across containers and/or requiring that communications between containers occur over secured (e.g., encrypted) communication channels. In some implementations, each container may be completely isolated with no visibility into other containers.

Isolation can protect against unintended disclosure of secrets, such as credentials 146 that are loaded into the build environment 140 together with the build code 142 and the program data 144. The credentials 146 may include user-supplied credentials used to perform certain steps in the build operation. Additionally or alternatively, the credentials 146 may include credentials loaded into the build environment 140 from an external source. Loading of credentials can occur when the build code includes or invokes a program module that will access the production system. For example, the build code 142 may include a first program module that requires one or more credentials from the credential store 128 in order to publish a result of the build operation (e.g., compiled source code) to the production repository 120. The required credential(s) can be passed into the first program module for execution within the build environment 140. If the first program module is assigned to its own container, other parts of the build code 142 can be prevented from accessing the same credential(s). In this way, the contents of the credential store 128 can be kept secret and used only by build code that has been preauthorized to do so, e.g., a program module from the trusted repository 126.

The computer system 110 may further include a security verification system 114 configured to perform an automated security check on build code at runtime, e.g., when the build code 142 is loaded into the build environment 140 for execution. The security verification system 114 may also perform a separate security check at publication time, when build code is published to the source repository 124 or the trusted repository 126. These security checks are not necessarily the same. The security check performed at publication time can serve as an alternative or supplement to manual review by a security team and provide a basis for permitting build code to be placed into a particular repository.

The security check at publication time may be more comprehensive than that performed at runtime since publication to a repository is usually less time constrained. For example, in some embodiments, publication of build code to the trusted repository 126 may be conditioned upon the build code successfully passing an automated scan for possible misuse of privileged credentials needed for production access, e.g., improper storage of a credential, exporting a credential to another program module or outside the computer system 110, using a credential to publish something other than a result of a build operation to the production repository 120, and/or the like.

By contrast, the security check at runtime may omit such detailed scanning of the build code. For example, in some embodiments, instead of rescanning the build code 142 after the build code has been loaded into the build environment 140 for execution, the security verification system 114 may simply verify that the build code 142 is authentic, e.g., the same as that which was originally published to the source repository 124 or the trusted repository 126. Assuming the build code 142 passed the security check done at publication time, the security verification system 114 can rely on the fact that the build code 142 has already been checked at least once and has not been modified since it was published to the source repository or the trusted repository.

In some embodiments, the security check at publication time may involve checking against user permissions 118 maintained by the computer system 110. The user permissions 118 may indicate which actions are permitted for a user 104 in relation to repositories where source code or workflow definitions reside. For example, the security verification system 114 may include a role-based access control subsystem for determining access to the source repository 124 and the trusted repository 126 including, for example, the right to make changes to the contents of either of these two repositories. A user 104 may be assigned to one or more roles defined by an administrator, where each role is associated with one or more rule-based policies that govern access to a repository. Thus, when the user 104 requests that build code be published to the trusted repository 126, the security verification system 114 may reference the user permissions 118 to determine whether the user 104 has permission to access the trusted repository (e.g., based on username, group ID, and/or other information about the user).

The information about the user 104 can be appended to the build code as metadata so that when the build code is later loaded for execution, the build code can be attributed to the user. However, the user permissions 118 may not necessarily provide for access to any production systems (e.g., the production repository 120). Instead, as discussed later below, access to a production system can based on the identity of the build code being executed and whether the build code is trusted or not. Build code that can be authenticated as coming from the trusted repository 126 will be deemed trustworthy and will therefore be able to obtain any credentials it may need for production access purposes. By contrast, build code that cannot be authenticated as coming from the trusted repository will be deemed untrustworthy and, therefore, unable to obtain production access. In this manner, build code can obtain runtime access to privileged credentials irrespective of the identity of the user requesting execution of the build code.

As discussed above, the authenticity of content from a repository can be verified using a cryptographic signature, sometimes referred to as a digital signature. Accordingly, the computer system 110 may include a signature generator 116 that generates a cryptographic signature for data (e.g., build code) when the data is published to the source repository 124 or the trusted repository 126. In some implementations, cryptographic signatures are only generated for build code. In other implementations, cryptographic signatures are generated for both build code and program data (e.g., source code). The signature generator 116 may generate a cryptographic signature by applying a cryptographic hash function to the data being published. The cryptographic signature can be stored with (e.g., appended to) the content in the repository. Thus, the build environment 140 may include one or more cryptographic signatures 148 that were obtained together with the build code 142 and/or the program data 144. The security verification system 114 can check whether the signature(s) 148 are as expected. If so, then the content for which the signature(s) 148 were generated is authentic.

In some implementations, the signature generator 116 may apply an encryption algorithm to generate the cryptographic signature using one or more encryption keys (e.g., a private key associated with the computer system 110). For example, the cryptographic signature may be formed through PGP (Pretty Good Privacy) encryption. PGP encryption involves a combination of hashing, symmetric-key cryptography, and public-key (asymmetric) cryptography. First, a hash function is applied to the original data to produce a hash value, sometimes referred to as a message digest. Next, the hash value is encrypted using a private key to form a digital signature. The digital signature can be decrypted using a corresponding public key to recover the hash value. A second hash value is generated by applying the hash function to the purported data. If the second hash value matches the hash value recovered from the digital signature, then the purported data is the same as the original data.

The input to the signature generator 116 can include metadata. For instance, when generating a signature for a Java archive (JAR) file containing source code and build code in separate sub-files, the signature generator 116 may apply a hash function to the entire JAR file, including the underlying source/build code and any accompanying metadata. The metadata may include information identifying an author of the file (e.g., user or group ID), information identifying the repository the file is published to (e.g., a file path), a timestamp (e.g., creation time or publication time), and/or other information describing the file and its contents. Such metadata can be applied at runtime to determine whether a signature is valid or not. Signing the entire file provides assurance that even the metadata has not been altered.

Figure 2:
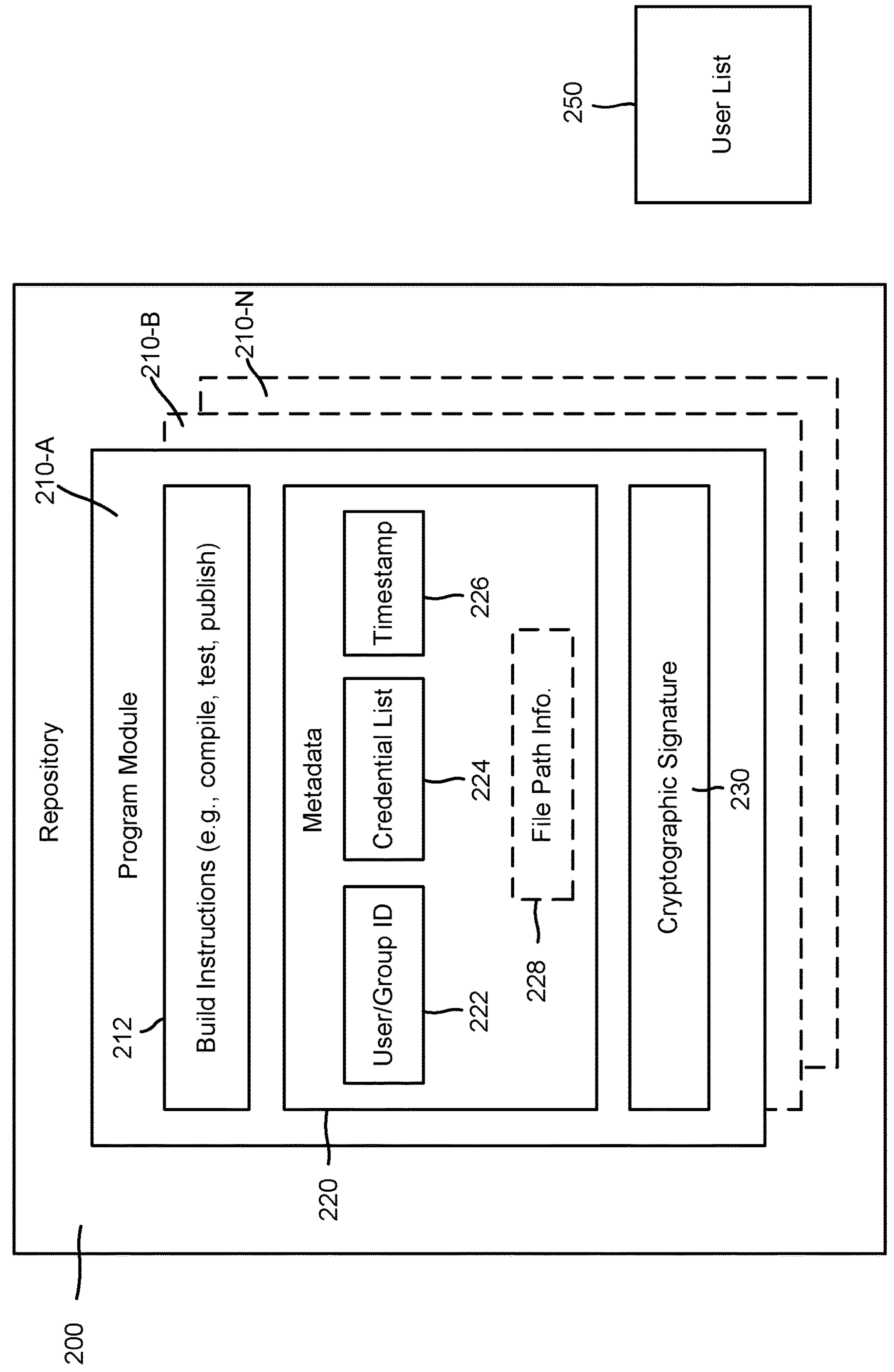
FIG. 2 shows an example of build code stored in a repository, according to some implementations.

FIG. 2 shows an example of build code stored in a repository 200, according to some implementations. A computing environment can include different types of repositories, such as source code repositories where source code and/or build workflow definitions reside. Another type of repository is an artifact repository, corresponding to a production system, where compiled source code and packaged software artifacts are stored. Referring back to FIG. 1, the repository 200 may correspond to the source repository 124 or the trusted repository 126. As shown in FIG. 2, the repository can include multiple program modules 210 (e.g., 210-A, 210-B, and 210-N). The program modules 210 correspond to build code, and each program module 210 may include a corresponding set of build instructions 212. The build instructions 212 may be executed to perform some or all the steps in a build operation. For example, program module 212-A may include build instructions 212 implementing compile, test, and/or publish steps for source code.

Each program module 210 may be attributed to one or more users 104 who authored the build instructions 212 of the program module. For example, the build instructions 212 of the program module 210-A may have originally been written by the user 104-A for use with source code written by the user 104-A. However, the program modules 210 can be reused across different sets of program data. Thus, the user 104-B could adopt the program module 210-A for their own purpose, e.g., so that the build instructions are executed with respect to source code written by the user 104-B. The program module 210-A can be made available to the user 104-B even if the user 104-B does not have direct access to the repository 200. For example, a list of program modules 210 in the repository 200 may be published to an electronic directory viewable by users 104 who belong to the same organization. Alternatively, the user 104-A may have expressly granted the user 104-B permission to use the program module 210-A. In any case, the program modules 210 may be shared with users who are not the original authors.

Continuing with the above example, the user 104-B may incorporate the program module 210-A into their own build code so that the build code is a composite of the program module 210-A plus one or more additional program modules (e.g., a program module attributed to the user 104-B or a third user). For example, the user 104-B may write build instructions for a second program module in a separate repository (e.g., the source repository 124), and the build instructions of the second program module may invoke the program module 210-A through a function call.

The identity of the user(s) to whom a program module 210 is attributed can be stored as part of the program module. For example, each program module 210 may contain metadata 220 including a user or group identifier (ID) 222. In this example, the user/group ID 222 could be an identifier associated with the user 104-A. The metadata 220 may further include a credential list 224, a timestamp 226, and/or other information describing the program module 210 and its contents. In some instances, the metadata 220 may include file path information 228 indicating where the program module is stored, e.g., a location in a directory structure of the repository 200. The file path information 228 may also indicate prior storage locations, e.g., a different folder in the repository 200 or a location in another repository from which the program module 210 was copied or transferred.

Credential list 224 includes one or more credentials required by the build instructions 212. For example, the credential list 224 can include a password value specified by the author of the build instructions 212. In some instances, the value of a credential may be directly encoded in the build instructions 212, e.g., a character string passed into a subroutine or function as an explicit parameter. Alternatively, the credential list 224 and/or the build instructions 212 may include a reference to a location where the value of a credential is stored. For example, the credential list 224 may include an address of a location in the credential store 128. Thus, the credential list 224 may, in some instances, include at least one credential needed in order to access the production repository 120.

Timestamp 226 may indicate when the build instructions 212 were published to the repository 200, e.g., a creation date and time of the program module 210-A. In some implementations, a program module may include additional timestamps indicating other time points related to the program module. For example, the metadata 220 can include a timestamp of when the build instructions 212 were last modified and/or a timestamp of when the build instructions 212 were last accessed (e.g., the most recent execution time). Thus, the metadata 220 may include a history of activity with respect to the build instructions, e.g., beginning with publication of the build instructions to the repository 200. The metadata 220 may even describe activity that occurred prior to publication. For example, the metadata 220 may include an Internet Protocol (IP) address or medium access control (MAC) address associated with an entity that supplied the build instructions (e.g., a computing device 102 or the source repository 124).

Each program module 210 may further include a cryptographic signature 230, e.g., one of the signatures 148 generated by the signature generator 116. The cryptographic signature 230 can be generated for the program module at the time the build instructions 212 are published to the repository 200 and is preferably immutable. However, in some implementations, the cryptographic signature 230 may be updated based on activity within the repository 200, e.g., if the program module 210 is moved to a different file folder in the repository or the build instructions 212 are overwritten with newer instructions. Thus, the cryptographic signature 230 can serve as a digital fingerprint that uniquely identifies the program module 210. This enables the program module 210 to be authenticated when the program module is subsequently accessed, e.g., when the build instructions 212 are loaded into the build environment 140 for execution.

FIG. 2 also shows a user list 250 associated with the repository 200. The user list 250 may represent users 104 who are authorized to publish content to the repository 200. For example, the user list 250 can include a list of every user or user group that has been granted write permission with respect to the repository 200. The user list 250 can be external to the repository and may, for example, be integrated with the user permissions 118 maintained by the computer system 110. Users not on the user list 250 would be unable to add program modules to the repository 200 or modify existing program modules in the repository 200. However, such users may still be permitted to execute a program module 210, e.g., by invoking the program module through their own build code. Alternatively or additionally, users not on the user list 250 may be granted permission to read from the repository 200, e.g., to copy the build instructions 212 into their own build code.

Figure 3:
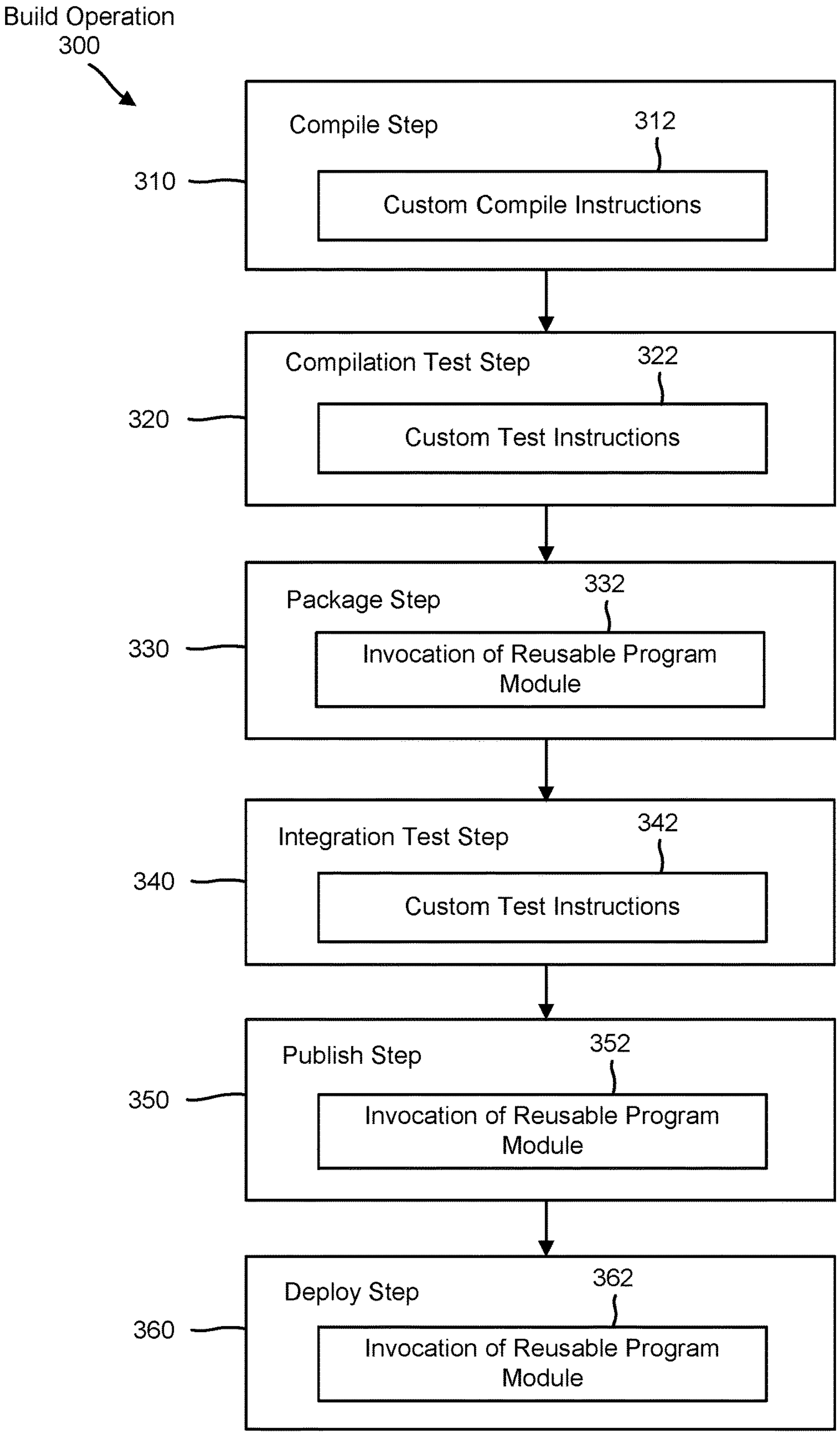
FIG. 3 shows an example of different stages in a build operation, according to some implementations.

FIG. 3 shows an example of different stages in a build operation 300, according to some implementations. The build operation 300 includes a compile step 310, a compilation test step 320, a package step 330, an integration test step 340, a publish step 350, and a deploy step 360. Compile step 310 may involve converting source code written in a high level programming language into a machine language (e.g., binary code) suitable for execution by a computer processor. The source code for the compile step 310 may correspond to a software application being developed by a user who initiates the build operation 300. Typically, the user initiating the build operation is also an author of the build instructions for the build operation. For example, a user 104 may write build code for one or more of the above-listed steps and then submit a request to the computer system 110 for executing the build code. However, in some instances, the user initiating the build operation may be different from the author of the build instructions.

Compilation test step 320 may involve executing the compiled source code to identify bugs or unintended program behavior. The compilation test step 320 can be performed using test data as input to the compiled source code. The test data can be supplied together with the build code (e.g., in a separate test file) so that the compilation test is fully automated. However, the compilation test can also be done using manual input to the compiled source code. Assuming the compiled source code successfully passes the compilation test step 320, the compiled source code is then packaged in the package step 330. If the compiled source code fails to pass the compilation test, the compiled source code may be revised, recompiled, and subjected to further compilation testing.

Package step 330 may involve combining the compiled source code with software libraries, media files, documentation (e.g., an instruction manual, an installation guide, or technical information for other developers), and/or other content to form a software artifact in a distributable format such as a JAR file. The software artifact can include a built-in installer program and may be encoded in a compressed format to minimize file size. Multiple items of compiled source code may be combined, e.g., to form an integrated unit from components that provide different functionality for the software application.

Integration test step 340 may involve executing the packaged source code to identify bugs or unintended program behavior. The integration test step 340 can be performed in a similar manner as the compilation test step 320 but differs with respect to the software functionality being tested. The compilation test step 320 generally involves executing each component of the software application independently to test the functionality of the components in isolation. By contrast, the integration test step 340 may involve testing the overall functionality of the software application, including evaluating interactions between components (e.g., what data is communicated between a first component and a second component). Integration testing can be performed concurrently on all the software components. Alternatively, the integrating testing can be done incrementally, with additional components being introduced into the test process (e.g., one at a time) after the functionality of a smaller subset of components has been verified. Assuming the packaged source code successfully passes the integration test step 340, the entire software package (i.e., the software artifact from package step 330) is published in publish step 350. If not, the packaged source code may be revised and subjected to further testing and repackaging, e.g., repeating some or all of steps 310 to 340.

Publish step 350 may involve publishing the software artifact to a repository of a production system, e.g., the production repository 120 in FIG. 1. Since the software artifact includes program data (e.g., compiled source code and associated libraries) that successfully passed the compilation and integration tests, the software artifact is a built artifact representing a complete version of the software application being developed. The software artifact can be uploaded through a secured communications channel accessed via one or more credentials. The credentials used to upload the software artifact can be obtained from a credential store (e.g., the credential store 128) on behalf of the user who initiated the build operation 300. The publication to the production system may be fully automated, e.g., performed in response to build instructions implementing the publish step 350. Thus, the computer system performing the build operation (e.g., computer system 110) may obtain the required credential(s) to submit a publication request to the production system.

Publication to a repository of a production system is similar to publication to other repositories (e.g., source repository 124 or trusted repository 126) in that code is copied to a specific destination for subsequent use. However, publication to a repository of a production system occurs much less frequently, with little or no changes to the published contents. For instance, the published software artifact may be deployed without further modification of the source code or other program data. Often, the published software artifact is deployed immediately or scheduled for deployment shortly after uploading. Deployment may involve making the software artifact available in a physical storage medium (e.g., as an optical disc image written to a CD-ROM or DVD). Alternatively, deployment may involve distributing the software artifact electronically (e.g., through an online marketplace). The software artifact may be used to install the software application on an end-user's computing device for local execution. In some instances, the software application may be remotely executed, e.g., as a web application.

As shown in FIG. 3, the build instructions for the build operation 300 can include one or more program modules, e.g., a separate program module for each of the steps 310 to 360. In the example shown, the build operation 300 includes steps implemented using custom build instructions. Specifically, the compile step 310, the compilation test step 320, and the integration test step 340 each include custom build instructions. The compile step 310 includes custom compile instructions 312, which may be written from scratch or derived from preexisting instructions. The compilation test step 320 includes custom test instructions 322, which may implement a test that is specific (e.g., uniquely applicable) to the source code being compiled instead of a generic compilation test. Similarly, the integration test step 340 includes custom test instructions 342, which may implement an integration test specific to the software package being built. These custom build instructions may reside in a repository accessible to a user without production access. For example, the program modules implementing the steps 310, 320, and 340 may correspond to one or more YAML files that were compiled into a single JAR file for storage as build code in the source repository 124.

Further, at least one of the program modules used to implement the build operation 300 may correspond to a reusable program module from a trusted repository such as the trusted repository 126. In fact, a build operation can be performed exclusively using a program module(s) from a trusted repository. However, in the example of FIG. 3, only the package step 330, the publish step 350, and the deploy step 360 are implemented with reusable program modules. The steps 330, 350, and 360 are amenable to being implemented with reusable program modules because these steps generally do not need to be customized for the software artifact being built. For instance, the publish step 350 may involve uploading the software artifact to the production repository 120 in the same manner as a software artifact produced through a different build operation.

In general, reusable program modules are well-suited for steps that are applicable to different sets of program data (e.g., independent source code). Sharing access to reusable program modules is beneficial since an author of build code would not have to create the build code entirely from scratch. Instead, the author could rely on preexisting build code for certain steps, e.g., frequently performed sub-operations such as publication to a production system. This is also beneficial from a security perspective since the preexisting build code can be trusted and is unlikely to behave unexpectedly. For instance, the program modules in the trusted repository 126 may have already been checked to confirm that credentials from the credential store 128 would not be passed into code from outside the trusted repository 126, exported from the build environment (e.g., to a user computing device 102), or used for an undesignated purpose (e.g., publication of a software artifact different from the one being built).

One way to incorporate a reusable program module into build code is to copy the instructions of the reusable program module directly into the build code. For example, a user with read access to the trusted repository 126 may write the custom compile instructions 312, and the custom test instructions 322 on their own computing device 102, then copy and paste instructions for the package step 330 from a program module in the trusted repository 126 before proceeding to writing the custom test instructions 342. However, this introduces the possibility that the instructions of the reusable program module are modified.

Another way to incorporate a reusable program module is to invoke the reusable program module. As shown in FIG. 3, the package step 330, the publish step 350, and the deploy step 360 can include program module invocations 332, 352, and 362, respectively. The invocations 332, 352, and 362 may reference their corresponding program modules through function calls embedded in the user's custom build code. In this way, the user need not have direct access to the reusable program modules. Invocation may be preferable over copying into the build code because the user is prevented from modifying the instructions of the reusable program modules, whether intentionally or by mistake. The cryptographic signature mechanism described above further ensures the integrity of the reusable program modules.

Figure 4:
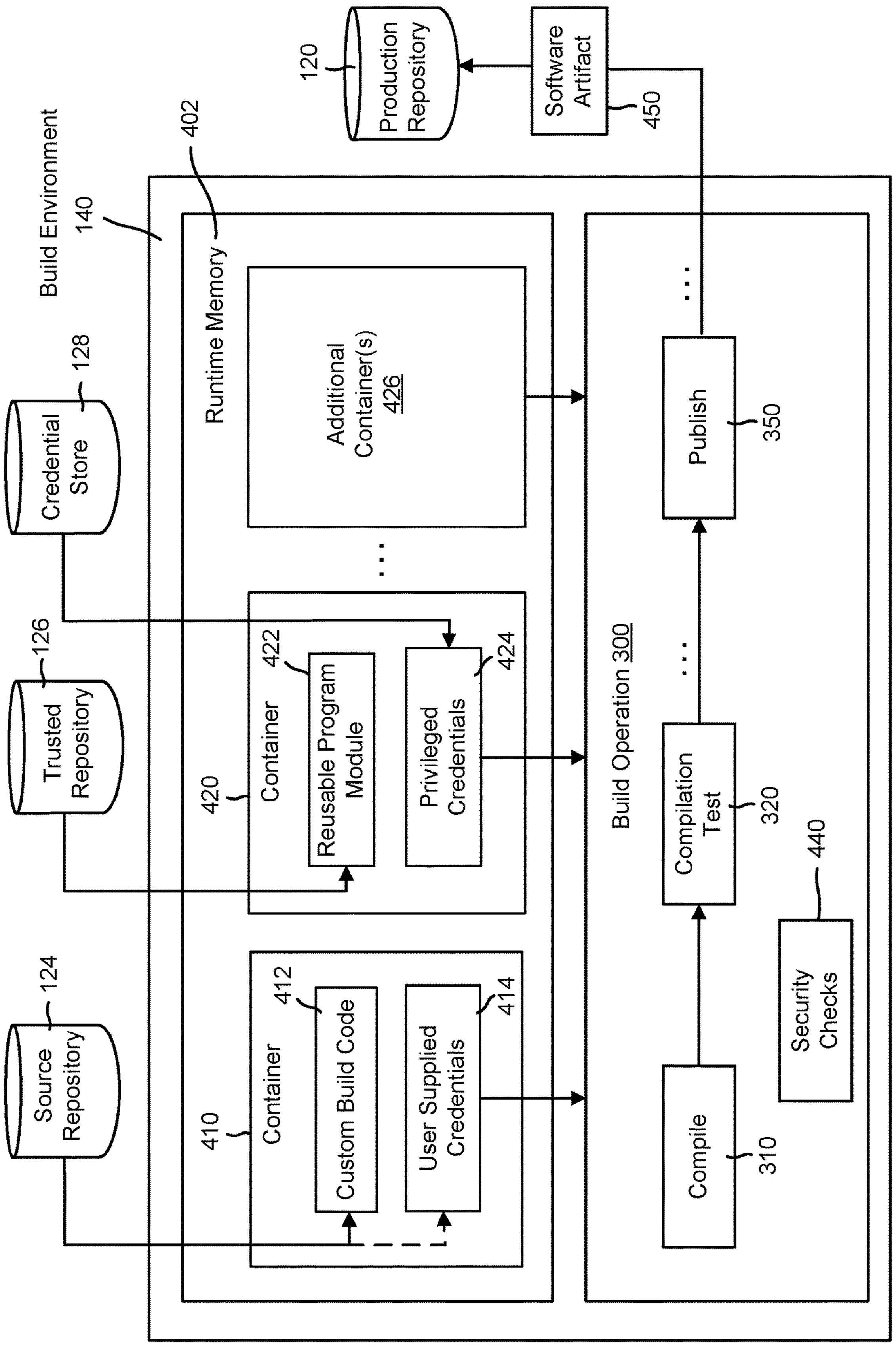
FIG. 4 shows an example of runtime execution of build code, according to some implementations.

FIG. 4 shows an example of runtime execution of build code, according to some implementations. In this example, the build operation 300 of FIG. 3 is executed within the build environment 140. However, the details of the build operation can vary, with steps being performed in a different order, steps being added or omitted, etc. Besides the build environment 140, other elements of the computing environment 100 may be involved in executing the build operation 300. For instance, FIG. 4 depicts data being loaded into a runtime memory 402 of the build environment 140 from the source repository 124, the trusted repository 126, and the credential store 128. The runtime memory 402 may correspond to one or more memory devices in the computer system 110 and can be configured for temporary storage of program data, build code, and/or other data to be processed.

Data in the runtime memory 402 may be grouped into logical containers to restrict access to credentials used during the build operation 300. Each container may be assigned a respective portion of the build code implementing the build operation 300 and a corresponding set of credentials. For example, a first container 410 may be assigned custom build code 412 and user supplied credentials 414. The custom build code 412 may be obtained from the source repository 124, possibly together with the user supplied credentials 414. Referring back to FIG. 3, the custom build code 412 may include instructions for one or more steps that have been custom configured by a user, e.g., the custom compile instructions 312, the custom test instructions 322, and/or the custom test instructions 342. The first container 410 may also include program data (e.g., source code) to be processed according to the custom build code 412. The program data is not shown for the sake of simplicity but can also be obtained from the source repository 124, e.g., through a single read operation that retrieves the program data together with the custom build code 412.

The user supplied credentials 414 can include any number of credentials required by the custom build code 412. As discussed above, such credentials may be provided in a number of ways, such as embedding in the build code, through manual input (e.g., in conjunction with a user's request to execute the custom build code 412), or retrieval from a specified location (e.g., a folder in the source repository 124). Because they reside in the same container as the custom build code 412, the user supplied credentials 414 may be accessible to any part of the custom build code 412. For instance, if the custom build code 412 includes multiple program modules, each program module may be able to read the user supplied credentials 414, even if the program module does not utilize this capability. As an example, the custom build code 412 may include a first program module and a second program module, where only the first program module calls for a first user supplied credential. If the author of the second program module (e.g., the same user who authored the first program module) knows how the first user supplied credential is identified (e.g., a name by which the credential is passed in as a variable), the author of the second program module could potentially modify the second program module to also use the first user supplied credential.

To avoid sharing credentials between different program modules, a separate container may be created for each program module. Separation of containers is particularly useful for isolating code that should not have access to privileged credentials (e.g., production secrets) from code entitled to such access. Accordingly, a reusable program module 422 may be loaded from the trusted repository 126 into a second container 420, together with privileged credentials 424 from the credential store 128. In this way, the reusable program module 422 can access the privileged credentials 424, but the custom build code 412 cannot. If the build code implementing the build operation 300 includes other program modules, a separate container can be created to load each module from its storage location (e.g., source repository 124 or trusted repository 126) into a corresponding container. Therefore, the runtime memory 402 may include any number of additional containers 426. Depending on the timing with which the program modules are executed, the containers may be created all at once or over time. For example, a container for a program module implementing the compile step 310 may be instantiated earlier than a container for a program module implementing the publish step 350. However, multiple containers can be maintained concurrently in the runtime memory 402.

After being loaded into their respective containers, the program modules are executed to perform the build operation 300. FIG. 4 shows the build operation 300 being performed in stages beginning with the compile step 310, followed by the compilation test step 320, then the publish step 350. However, the order of the sub-operations is not necessarily sequential, e.g., certain steps may be performed in parallel. Additionally, FIG. 4 shows security checks 440, which may be added to the build operation 300 by the computer system 110. The security checks 440 may correspond to a series of automated checks performed by the security verification system 114 with respect to the build code being loaded for execution. For example, referring back to FIG. 2, each time a program module is loaded into a container, the security verification system 114 may check the cryptographic signature 230 to verify the authenticity of the program module. Optionally, the security verification system 114 may also check the metadata 220 against the user permissions 118 to confirm (e.g., based on the user/group ID 222) that the program module is attributed to someone who had a right to publish to the repository from which the program module was loaded.

Loading of privileged credentials into containers may be conditioned upon the program module passing both the cryptographic signature and metadata based checks. If either of these checks fails, the build execution system 112 may prevent the program module from being loaded and/or executed. Alternatively, the build execution system 112 may permit the program module to execute but ignore any privileged requests from the program module. If the build code implementing the publish step 350 (e.g., the reusable program module 422) passes the security checks 440, the publish step 350 will execute to completion and publish a built software artifact 450 to the production repository 120. Additional software artifacts may be published to the production repository 120 in a similar manner, through creating containers and performing security checks 440 at runtime.

Figure 5:
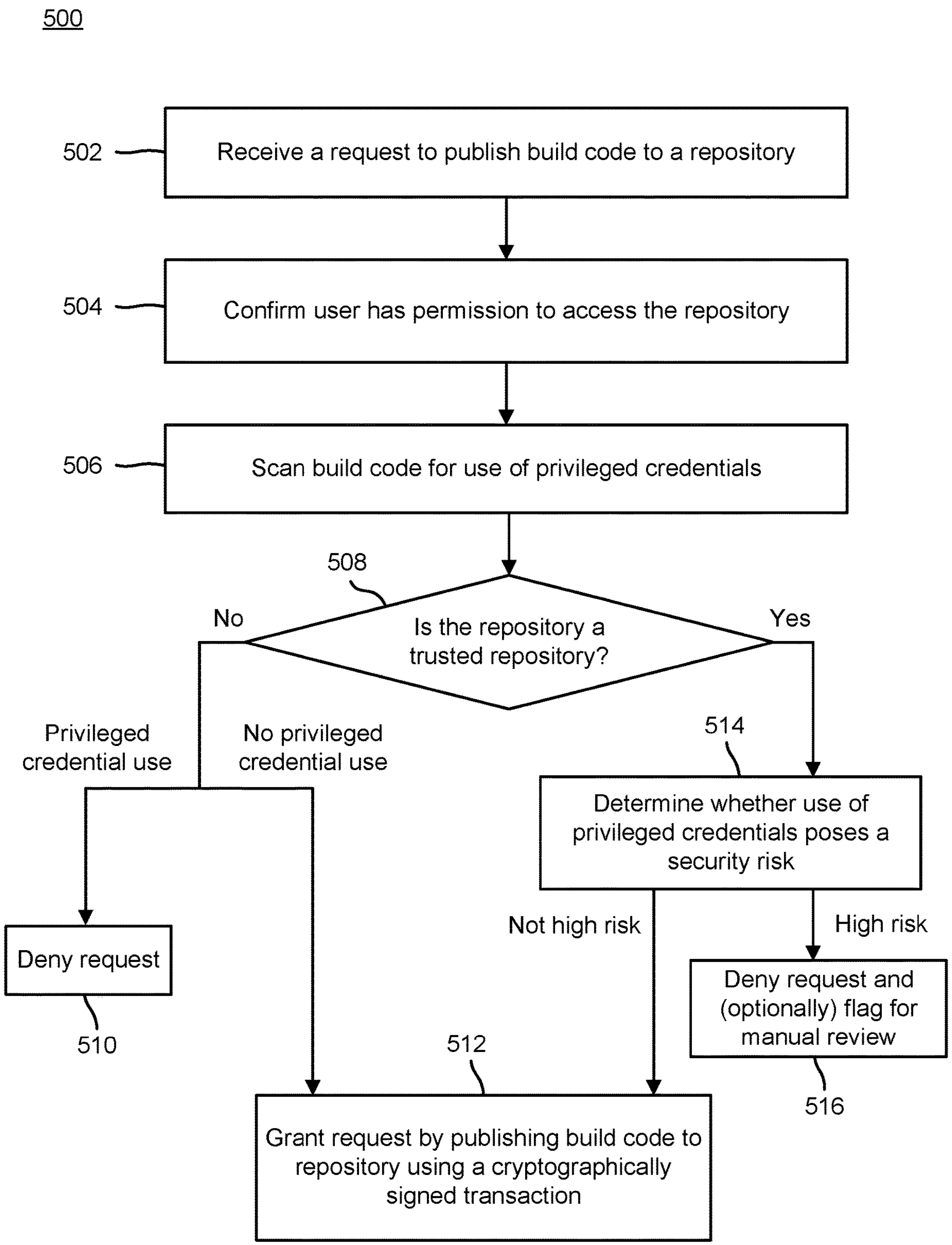
FIG. 5 is a flow diagram of a process for publishing build code to a repository, in accordance with some implementations.

FIG. 5 is a flow diagram of a process 500 for publishing build code to a repository, in accordance with some implementations. The process 500 can be performed by the computer system 110, using the security verification system 114 and the signature generator 116. At 502, the computer system 110 may receive a request to publish build code to a repository. The request may be sent from a user computer device 102 and may indicate which repository to publish to (e.g., the source repository 124 or the trusted repository 126). The request can include a copy of the build code or indicate where the build code is stored (e.g., a hard drive of the user computing device 102).

At 504, the computer system 110 may confirm that the user who submitted the request has permission to access the repository. For example, the request may be associated with a user or group ID, and the security verification system 114 may check the user permissions 118 to determine whether the user/group ID has been granted permission to modify (e.g., write access privilege) the contents of the repository. If it is determined that the user lacks the requisite permission, the request is denied. Otherwise, the process 500 proceeds to 506.

At 506, the computer system 110 may scan the build code for use of privileged credentials. As discussed above, credentials used during a build operation can include user supplied credentials and/or privileged credentials. Privileged credentials may include credentials needed to access a production system and are typically known only to a small subset of users. For example, an administrative user may configure a password for logging into a server hosting the production repository 120. Accordingly, the functionality in 506 may involve scanning through each line of code to determine whether there are any privileged requests such as a request to obtain a credential from the credential store 128.

At 508, the computer system 110 may determine whether the repository is a trusted repository (e.g., the trusted repository 126). The request can be handled differently based on the results of this determination and the scanning in 506. If the repository is not a trusted repository (e.g., the source repository 124), the process 500 proceeds to either 510 or 512 depending on whether the build code calls for use of privileged credentials.

At 510, it has been determined that the repository is not a trusted repository and, further, that the build code includes at least one instance of privileged credential use. Since build code from a non-trusted repository is not entitled to use privileged credentials, the request is denied and further processing of the request is halted. The computer system 110 may communicate an error message to the user computing device 102 indicating why the request was denied.

At 512, it has been determined that the repository is not a trusted repository and, further, that the build code does not use any privileged credentials. Therefore, the computer system 110 may grant the request by publishing the build code to the repository. The build code may be published in the form of a compiled artifact (e.g., a JAR file). The build code can be compiled prior to submitting the request in 502, e.g., by a software compiler running on the user's computing device 102. Alternatively, the computer system 110 may compile the build code in conjunction with granting the request in 512. The build code is published using a cryptographically signed transaction. For example, referring back to FIG. 2, the computer system 110 may generate the cryptographic signature 230 for the build code using one or more elements of the metadata 220. As discussed above, the cryptographic signature enables the build code to later be authenticated when loaded for execution.

If the repository is a trusted repository, additional processing may be performed to determine whether to grant the request. For example, at 514, a determination is made as to whether any use of privileged credentials poses a security risk. The determination in 514 can be automated and may involve scanning the build code at a deeper level compared to the scanning in 506. For instance, the security verification system 114 may analyze each instruction requesting a privileged credential to determine how the instruction acts on the privileged credential. Actions that fall outside a predefined range of permitted uses may be grounds for deeming the build code high risk, in which case the computer system 110 may deny the request (at 516). Optionally, the computer system 110 may flag any such instructions for manual review by a security team. Examples of unpermitted uses include exporting a privileged credential outside the build environment (e.g., to a user computing device 102), using a privileged credential to publish content that is not a result of executing the build code (e.g., a pre-generated software artifact), and passing a privileged credential between program modules.

If the determination in 514 indicates that the build code is not high risk, the process 500 may proceed to 512 where, as discussed above, the build code is published using a cryptographically signed transaction. Automating the determination in 514 can potentially save a significant amount of time, enabling build code to be published to the trusted repository without waiting for approval from a security team. However, the determination in 514 can be automated to supplement rather than replace manual review. In particular, the functionality in 514 and 516 permits the computer system 110 to perform an initial pass to filter out build code that is not high risk, enabling such code to be published immediately. The workload of the security team may be reduced as a result of leaving only high risk code for manual review.

In some implementations, the denial of the request in 510 or 516 may involve communicating an error message to the user. The error message can include an explanation of why the request was denied. Such feedback would give the user an opportunity to address the cause of the denial and avoid surprising the user when the build code is later executed unsuccessfully.

Figure 6:
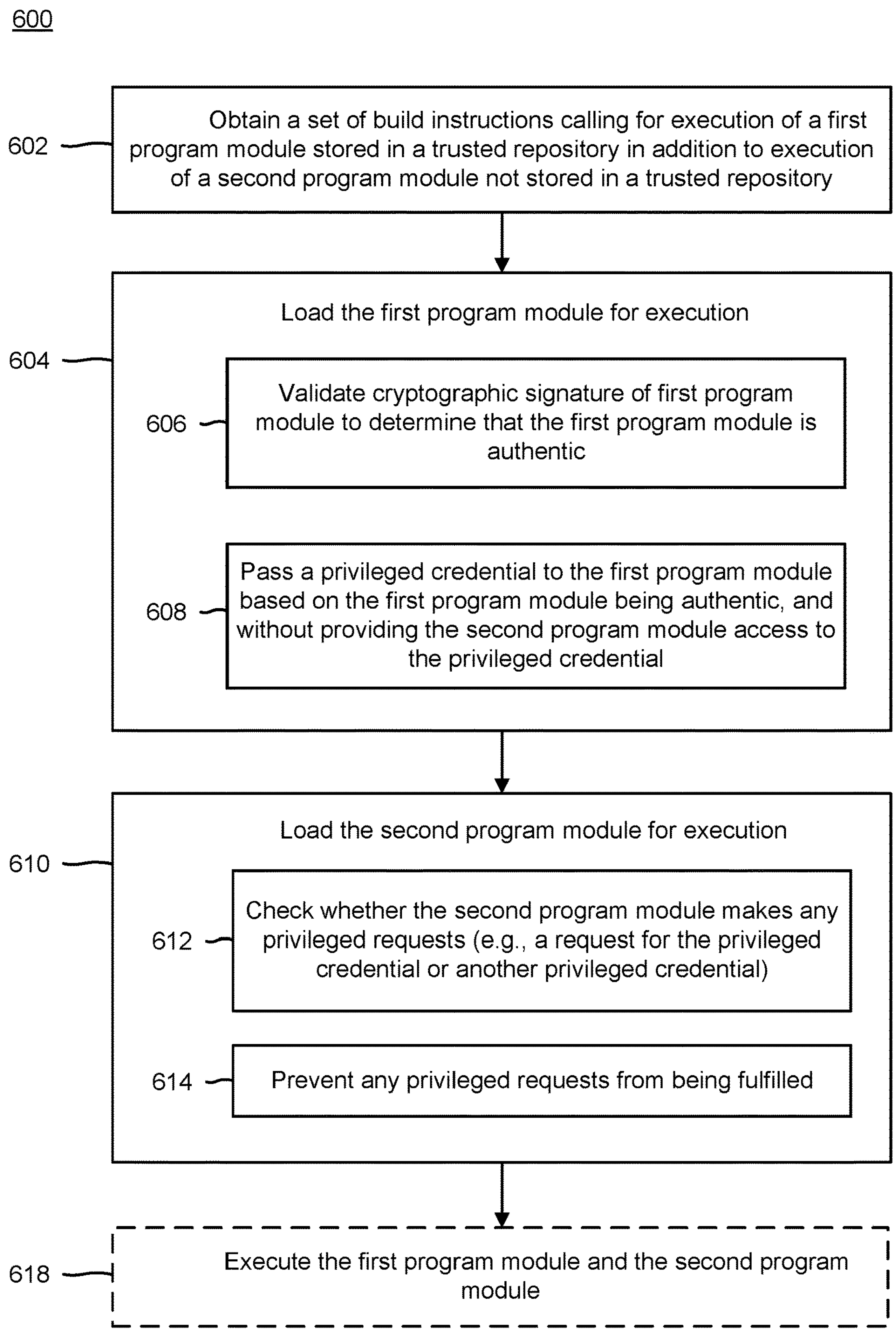
FIG. 6 is a flow diagram of a process for executing build code, in accordance with some implementations.

FIG. 6 is a flow diagram of a process 600 for executing build code, in accordance with some implementations. The process 600 may be performed by the computer system 110, using the build execution system 112 and the security verification system 114. At 602, the computer system 110 may obtain a set of build instructions calling for execution of a first program module stored in a trusted repository (e.g., the trusted repository 126) in addition to execution of a second program module not stored in a trusted repository. The build instructions may reside in the same repository as the second program module (e.g., the source repository 124) and may, in some instances, be integrated into the second program module. For example, referring back to FIG. 4, the build instructions obtained in 602 may be part of the custom build code 412. To initiate a build operation, a user 104 may submit, through their computing device 102, a request for execution of the custom build code 412. The custom build code 412 can include instructions implementing the second program module (e.g., the custom compile instructions 312 in FIG. 3). The first program module (e.g., the reusable program module 422) may be stored separately in the trusted repository. However, as explained above, program modules can be invoked. For example, in addition to having instructions implementing the second program module, the custom build code 412 can include an instruction referencing the first program module.

In some instances, both the first program module and the second program module may be invoked through the build instructions. Thus, the build instructions obtained in 602 need not include the underlying code for either the first program module or the second program module. For example, the build instructions in 602 can be a high-level workflow definition containing a list of steps arranged in sequence of execution, with an indication of which program module will perform each step. The high-level workflow definition can be translated to a low-level workflow definition format through loading the program modules.

At 604, the computer system 110 may load the first program module for execution. The loading of the first program module may involve retrieving the first program module from the trusted repository and instantiating a corresponding container (e.g., the container 420). For example, if the first program module is stored as a JAR file, the first program module can be loaded by injecting it into a Java classpath. As part of the loading process, the computer system 110 may (at 606) validate a cryptographic signature of the first program module (e.g., the cryptographic signature 230) to determine that the first program module is authentic.

The functionality in 606 may involve computing a second cryptographic signature based on the metadata 220 in the first program module and comparing the second cryptographic signature to the cryptographic signature 230 of the first program module. The privileged credential may correspond to a credential in the credential store 128. The loading of the first program module may further involve passing the privileged credential to the first program module (at 608) based on the first program module being authentic. That is, the passing of the privileged credential may be conditioned upon successfully validation of the cryptographic signature in 606. The second program module can be loaded into a separate container, as discussed below. As such, the first privileged credential can be passed to the first program module without providing the second program module access to the first privileged credential.

In some implementations, whether or not the first program module is permitted to access the privileged credential may also be determined based on metadata. For example, in addition to validating the cryptographic signature, the security verification system 114 may optionally check the user/group ID 222 and the credential list 224 against the user permissions 118 to confirm that the user/group ID 222 belongs to someone who was given permission to update the contents of the trusted repository (subject to automated and/or manual review as discussed above). However, the security verification system 114 need not evaluate the underlying code since the first program module would have been scanned before being allowed to publish to the trusted repository (e.g., according to 514 in FIG. 5).

At 610, the computer system 110 may load the second program module for execution. The relative timing of the loading of the first program module and the loading of the second program module can vary. In some instances, the second program module may be loaded before the first program module. In other instances, both program modules may be loaded concurrently. The loading of the second program module may involve checking (at 612) whether the second program module makes any privileged requests. A privileged request may, for example, be a request for a credential to which program modules in the trusted repository have been granted permission (e.g., the privileged credential from 608 or another credential from the credential store 128).

The check in 612 may involve scanning the loaded code to determine whether the second program module includes an instruction that requests a privileged credential, similar to the scanning in 506 of FIG. 5. Additionally, although not shown in FIG. 6, the computer system 110 may validate a cryptographic signature of the second program module to determine that the second program module is authentic. Like the validation of the cryptographic signature of the first program module, validating the cryptographic signature of the second program module ensures that the program module has not been tampered with.

In some implementations, the code of the second program module may not be scanned for privileged requests at runtime, since this would have been done when the second program module was published (e.g., to the source repository 124 and according to 506 in FIG. 5). Instead of rescanning the second program module, the security verification system 114 may rely on the results of the earlier scan in 506 in combination with determining the authenticity of the second program module. Thus, the check in 612 can be an implicit check based on validating the cryptographic signature of the second program module. However, scanning for privileged requests at runtime is usually computationally inexpensive and may provide an additional measure of assurance. In some cases, a runtime scan may detect a privileged request that was missed during the publication process.

At 614, any privileged requests detected during the checking of the second program module are prevented from being fulfilled. This can be done in various ways. One option is to prevent the second program module from executing altogether, in which case the first program module may also be prevented from executing. Thus, the build execution system 112 may terminate the entire build operation. The build execution system 112 may also output an error message to the user, e.g., a message indicating that any path to production steps need to be contributed from the trusted repository. The error message may optionally indicate which privileged credential(s) caused the second program module to not execute. This would provide the user with feedback on which credentials are disallowed for use with build code outside the trusted repository. As an alternative to terminating the build operation, the build execution system 112 may permit the user to correct the error by specifying a substitute for the second program module (e.g., selecting a different module from the source repository 124).

Another option for preventing fulfillment of privileged requests from the second program module is to ignore any such requests. For example, the build execution system 112 may refuse to pass privileged credentials to the second program module and/or skip execution of any instructions that request a privileged credential. In this way, the second program module can be permitted to partially execute.

At 618, the computer system 110 may execute the first program module and the second program module depending on the results of the processing in 604 to 614. The program modules may execute in sequence since build operations generally involve steps in a particular order, with some steps being prerequisites for other steps (e.g., the compile step 310 is a prerequisite for the compilation test step 320). However, sequential execution does not preclude time overlap between operations of the first program module and operations of the second program module.

Figure 7A:
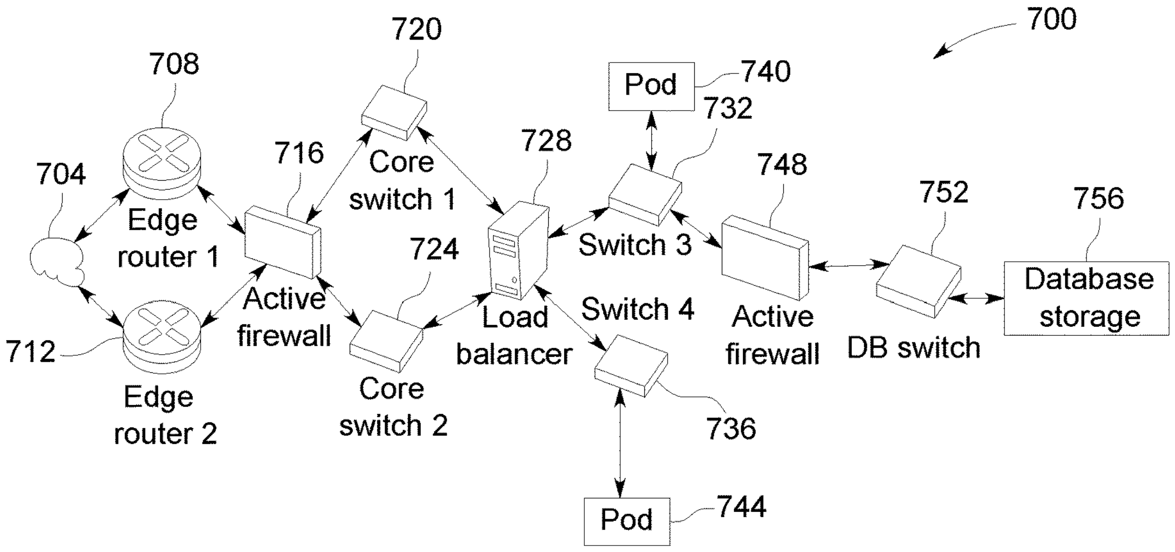
FIG. 7A shows a system diagram illustrating architectural components of an applicable environment, in accordance with some implementations.

FIG. 7A shows a system diagram illustrating architectural components of an on-demand service environment 700, in accordance with some implementations. For instance, the on-demand service environment 700 may correspond to an implementation of computing environment 100 in FIG. 1. A client machine located in the cloud 704 (or Internet) may communicate with the on-demand service environment via one or more edge routers 708 and 712. The edge routers may communicate with one or more core switches 720 and 724 via firewall 716. The core switches may communicate with a load balancer 728, which may distribute server load over different pods, such as pods 740 and 744. The pods 740 and 744, which may each include one or more servers and/or other computing resources, may perform data processing and other operations used to provide on-demand services. Communication with the pods may be conducted via pod switches 732 and 736. Components of the on-demand service environment may communicate with a database storage system 756 via a database firewall 748 and a database switch 752.

Figure 7B:
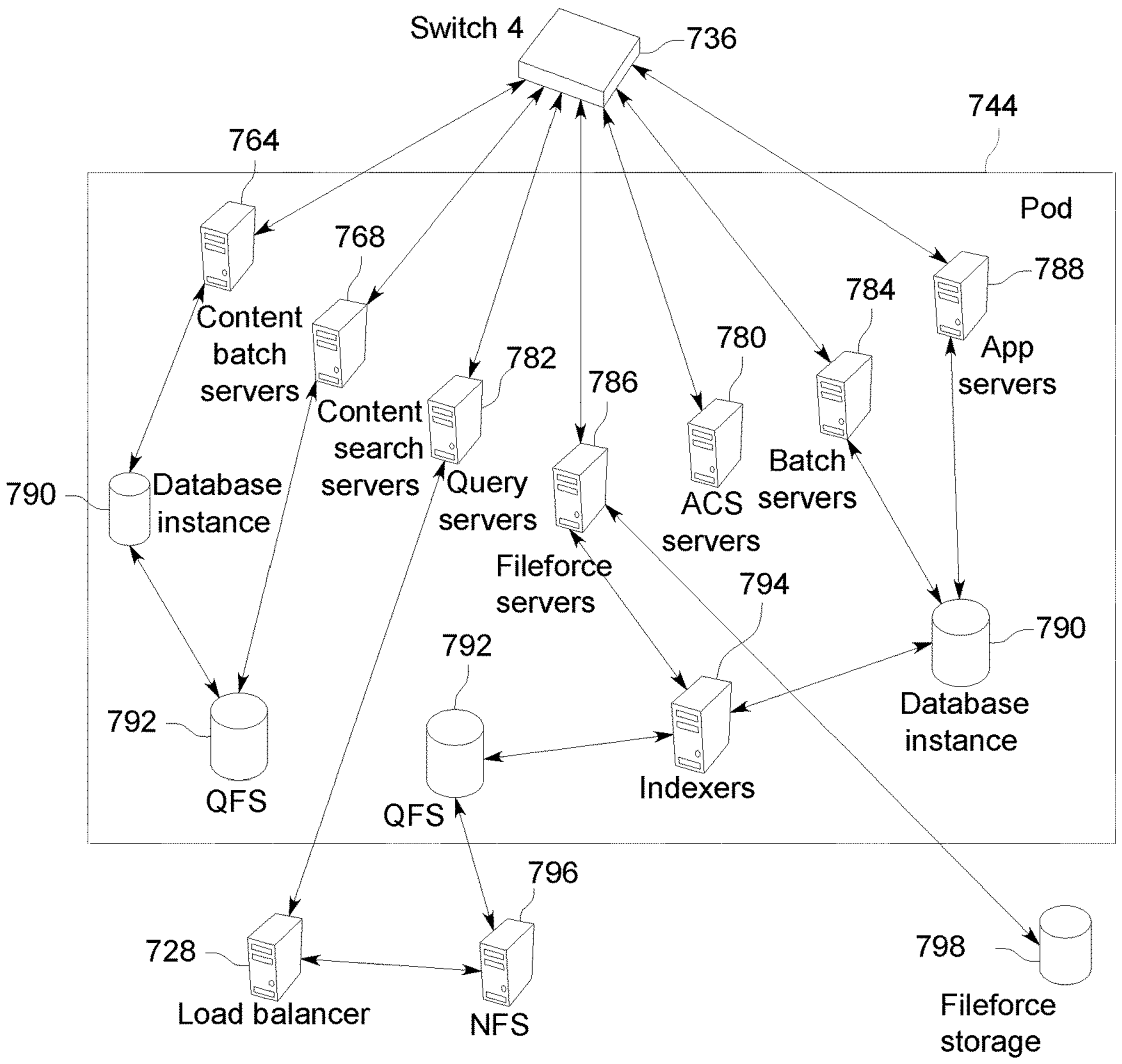
FIG. 7B shows a system diagram further illustrating architectural components of an applicable environment, in accordance with some implementations.

As shown in FIGS. 7A and 7B, accessing an on-demand service environment may involve communications transmitted among a variety of different hardware and/or software components. Further, the on-demand service environment 700 is a simplified representation of an actual on-demand service environment. For example, while only one or two devices of each type are shown in FIGS. 7A and 7B, some implementations of an on-demand service environment may include anywhere from one to many devices of each type. Also, the on-demand service environment need not include each device shown in FIGS. 7A and 7B or may include additional devices not shown in FIGS. 7A and 7B.

Moreover, one or more of the devices in the on-demand service environment 700 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 704 is intended to refer to a data network or plurality of data networks, often including the Internet. Client machines located in the cloud 704 may communicate with the on-demand service environment to access services provided by the on-demand service environment. For example, client machines may access the on-demand service environment to retrieve, store, edit, and/or process information.

In some implementations, the edge routers 708 and 712 route packets between the cloud 704 and other components of the on-demand service environment 700. The edge routers 708 and 712 may employ the Border Gateway Protocol (BGP). The BGP is the core routing protocol of the Internet.

The edge routers 708 and 712 may maintain a table of IP networks or 'prefixes' which designate network reachability among autonomous systems on the Internet.

In one or more implementations, the firewall 716 may protect the inner components of the on-demand service environment 700 from Internet traffic. The firewall 716 may block, permit, or deny access to the inner components of the on-demand service environment 700 based upon a set of rules and other criteria. The firewall 716 may act as one or more of a packet filter, an application gateway, a stateful filter, a proxy server, or any other type of firewall.

In some implementations, the core switches 720 and 724 are high-capacity switches that transfer packets within the on-demand service environment 700. The core switches 720 and 724 may be configured as network bridges that quickly route data between different components within the on-demand service environment. In some implementations, the use of two or more core switches 720 and 724 may provide redundancy and/or reduced latency.

In some implementations, the pods 740 and 744 may perform the core data processing and service functions provided by the on-demand service environment. Each pod may include various types of hardware and/or software computing resources. An example of the pod architecture is discussed in greater detail with reference to FIG. 7B.

In some implementations, communication between the pods 740 and 744 may be conducted via the pod switches 732 and 736. The pod switches 732 and 736 may facilitate communication between the pods 740 and 744 and client machines located in the cloud 704, for example via core switches 720 and 724. Also, the pod switches 732 and 736 may facilitate communication between the pods 740 and 744 and the database storage 756.

In some implementations, the load balancer 728 may distribute workload between the pods 740 and 744. Balancing the on-demand service requests between the pods may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748. The database firewall 748 may act as a computer application firewall operating at the database application layer of a protocol stack. The database firewall 748 may protect the database storage 756 from application attacks such as structure query language (SQL) injection, database rootkits, and unauthorized information disclosure.

In some implementations, the database firewall 748 may include a host using one or more forms of reverse proxy services to proxy traffic before passing it to a gateway router. The database firewall 748 may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, communication with the database storage system 756 may be conducted via the database switch 752. The multi-tenant database system 756 may include more than one hardware and/or software components for handling database queries. Accordingly, the database switch 752 may direct database queries transmitted by other components of the on-demand service environment (e.g., the pods 740 and 744) to the correct components within the database storage system 756. In some implementations, the database storage system 756 is an on-demand database system shared by many different organizations. The on-demand database system may employ a multi-tenant approach, a virtualized approach, or any other type of database approach. An on-demand database system is discussed in greater detail with reference to FIGS. 8 and 9.

FIG. 7B shows a system diagram illustrating the architecture of the pod 744, in accordance with one implementation. The pod 744 may be used to render services to a user of the on-demand service environment 700. In some implementations, each pod may include a variety of servers and/or other systems. The pod 744 includes one or more content batch servers 764, content search servers 768, query servers 782, Fileforce servers 786, access control system (ACS) servers 780, batch servers 784, and app servers 788. Also, the pod 744 includes database instances 790, quick file systems (QFS) 792, and indexers 794. In one or more implementations, some or all communication between the servers in the pod 744 may be transmitted via the switch 736.

In some implementations, the application servers 788 may include a hardware and/or software framework dedicated to the execution of procedures (e.g., programs, routines, scripts) for supporting the construction of applications provided by the on-demand service environment 700 via the pod 744. Some such procedures may include operations for providing the services described herein. The content batch servers 764 may handle requests internal to the pod. These requests may be long-running and/or not tied to a particular customer. For example, the content batch servers 764 may handle requests related to log mining, cleanup work, and maintenance tasks.

The content search servers 768 may provide query and indexer functions. For example, the functions provided by the content search servers 768 may allow users to search through content stored in the on-demand service environment. The Fileforce servers 786 may manage requests for information stored in the Fileforce storage 798. The Fileforce storage 798 may store information such as documents, images, and basic large objects (BLOBs). By managing requests for information using the Fileforce servers 786, the image footprint on the database may be reduced.

The query servers 782 may be used to retrieve information from one or more file systems. For example, the query servers 782 may receive requests for information from the app servers 788 and then transmit information queries to network file systems (NFS) 796 located outside the pod. The pod 744 may share a database instance 790 configured as a multi-tenant environment in which different organizations share access to the same database. Additionally, services rendered by the pod 744 may require various hardware and/or software resources. In some implementations, the ACS servers 780 may control access to data, hardware resources, or software resources.

In some implementations, the batch servers 784 may process batch jobs, which are used to run tasks at specified times. Thus, the batch servers 784 may transmit instructions to other servers, such as the app servers 788, to trigger the batch jobs. For some implementations, the QFS 792 may be an open source file system available from Sun Microsystems® of Santa Clara, California. The QFS may serve as a rapid-access file system for storing and accessing information available within the pod 744. The QFS 792 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 768 and/or indexers 794 to identify, retrieve, move, and/or update data stored in the NFS 796 and/or other storage systems.

In some implementations, one or more query servers 782 may communicate with the NFS 796 to retrieve and/or update information stored outside of the pod 744. The NFS 796 may allow servers located in the pod 744 to access information to access files over a network in a manner similar to how local storage is accessed. In some implementations, queries from the query servers 782 may be transmitted to the NFS 796 via the load balancer 728, which may distribute resource requests over various resources available in the on-demand service environment. The NFS 796 may also communicate with the QFS 792 to update the information stored on the NFS 796 and/or to provide information to the QFS 792 for use by servers located within the pod 744.

In some implementations, the pod may include one or more database instances 790. The database instance 790 may transmit information to the QFS 792. When information is transmitted to the QFS, it may be available for use by servers within the pod 744 without requiring an additional database call. In some implementations, database information may be transmitted to the indexer 794. Indexer 794 may provide an index of information available in the database 790 and/or QFS 792. The index information may be provided to Fileforce servers 786 and/or the QFS 792.

Figure 8:
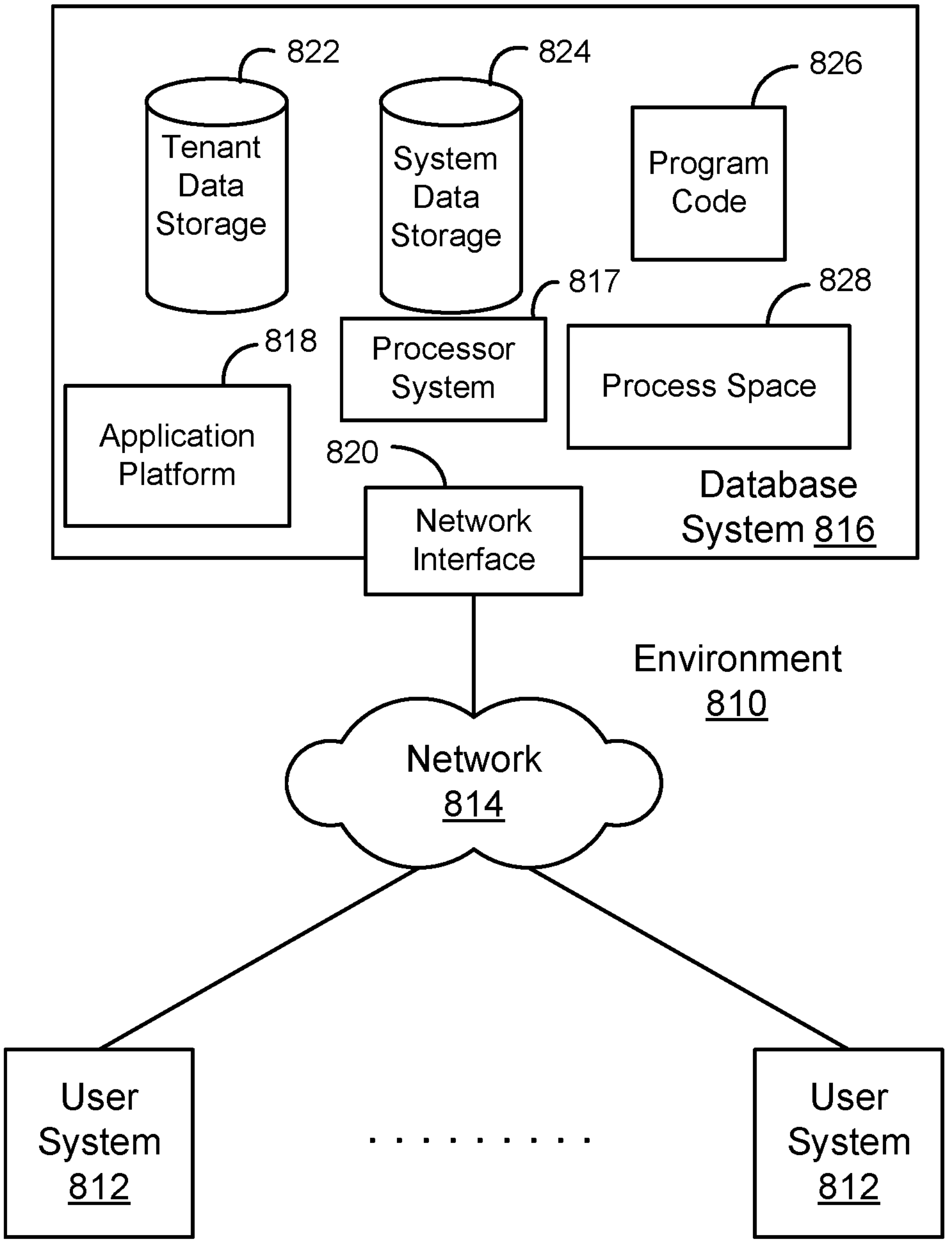
FIG. 8 shows a system diagram illustrating the architecture of a multi-tenant database environment, in accordance with some implementations.
Figure 9:
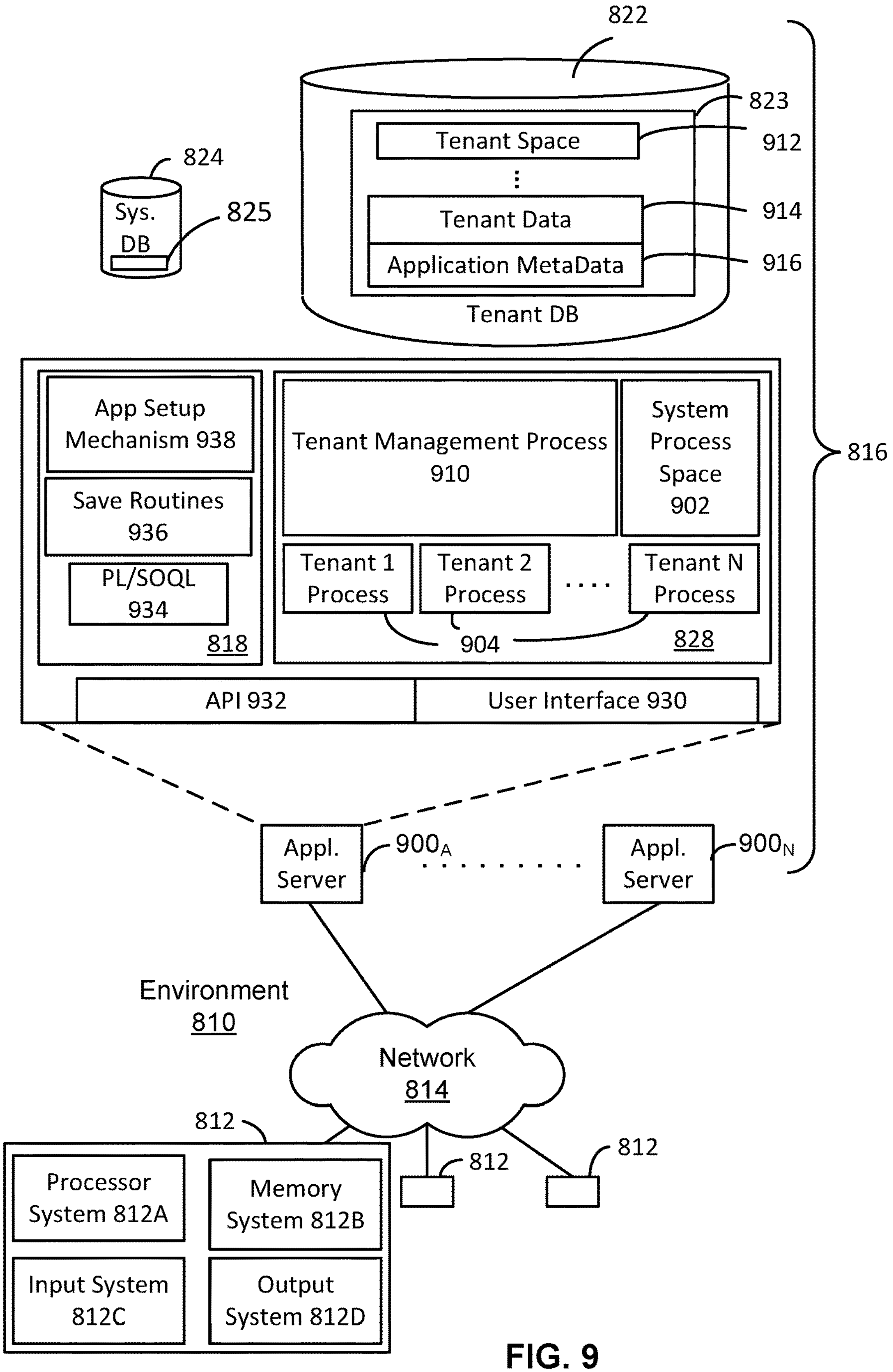
FIG. 9 shows a system diagram further illustrating the architecture of a multi-tenant database environment, in accordance with some implementations.

FIG. 8 shows a block diagram of an environment 810 wherein an on-demand database service might be used, in accordance with some implementations. Environment 810 includes an on-demand database service 816. User system 812 may be any machine or system that is used by a user to access a database user system. For example, any of user systems 812 can be a handheld computing system, a mobile phone, a laptop computer, a workstation, and/or a network of computing systems. As illustrated in FIGS. 8 and 9, user systems 812 might interact via a network 814 with the on-demand database service 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDBMS) or the equivalent may execute storage and retrieval of information against the database object(s). Application platform 818 may be a framework that allows the applications of system 816 to run, such as the hardware and/or software, e.g., the operating system. In an implementation, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

The users of user systems 812 may differ in their respective capacities, and the capacity of a particular user system 812 might be entirely determined by permissions (permission levels) for the current user. For example, where a call center agent is using a particular user system 812 to interact with system 816, the user system 812 has the capacities allotted to that call center agent. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some implementations, system 816, shown in FIG. 8, implements a web-based customer relationship management (CRM) system. For example, in some implementations, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 816 implements applications other than, or in addition to, a CRM application. For example, system 816 may provide tenant access to multiple hosted (standard and custom) applications. User (or third party developer) applications, which may or may not include CRM, may be supported by the application platform 818, which manages creation, storage of the applications into one or more database objects and executing of the applications in a virtual machine in the process space of the system 816.

Each user system 812 could include a desktop personal computer, workstation, laptop, PDA, cell phone, or any wireless access protocol (WAP) enabled device or any other computing system capable of interfacing directly or indirectly to the Internet or other network connection. User system 812 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814.

Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some implementations, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for carrying out disclosed operations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some implementations, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also shows a block diagram of environment 810 further illustrating system 816 and various interconnections, in accordance with some implementations. FIG. 9 shows that user system 812 may include processor system 812A, memory system 812B, input system 812C, and output system 812D. FIG. 8 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers 900A-900N, system process space 902, tenant process spaces 904, tenant management process space 910, tenant storage area 912, user storage 914, and application metadata 916. In other implementations, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of processors.

Memory system 812B may be any combination of one or more memory devices, short term, and/or long term memory. Input system 812C may be any combination of input devices, such as keyboards, mice, trackballs, scanners, cameras, and/or interfaces to networks. Output system 812D may be any combination of output devices, such as monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as Oracle™ databases.

Application platform 818 includes an application setup mechanism 938 that supports application developers' creation and management of applications, which may be saved as metadata into tenant data storage 822 by save routines 936 for execution by subscribers as tenant process spaces 904 managed by tenant management process 910 for example. Invocations to such applications may be coded using PL/SOQL 934 that provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server 900 might be coupled via the network 814 (e.g., the Internet), another application server 900 might be coupled via a direct network link, and another application server 900 might be coupled by yet a different network connection. Transfer Control Protocol and Internet Protocol (TCP/IP) are typical protocols for communicating between application servers 900 and the database system. However, other transport protocols may be used to optimize the system depending on the network interconnect used.

In certain implementations, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In some implementations, therefore, an interface system implementing a load balancing function (e.g., an F5 Big-IP load balancer) is communicably coupled between the application servers 900 and the user systems 812 to distribute requests to the application servers 900. In some implementations, the load balancer uses a least connections algorithm to route user requests to the application servers 900. Other examples of load balancing algorithms, such as round robin and observed response time, also can be used. For example, in certain implementations, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each call center agent uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain implementations, user systems 812 (which may be client machines/systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer-implemented method comprising:

obtaining, by a computer system, a set of build instructions calling for execution of a first program module stored in a trusted repository in addition to execution of a second program module not stored in the trusted repository, wherein the first program module and the second program module are executable to perform build operations for software under development, and wherein the trusted repository stores program modules that have been approved to make privileged requests using one or more privileged credentials;

loading the first program module for execution, wherein the loading of the first program module comprises:

validating, by the computer system, a cryptographic signature of the first program module to determine that the first program module is authentic, and passing, by the computer system, a privileged credential to the first program module without providing the second program module access to the privileged credential, wherein the passing of the privileged credential is conditioned upon successful validation of the cryptographic signature; and loading the second program module for execution, wherein the loading of the second program module comprises:

determining, by the computer system, whether the second program module makes any privileged requests, and preventing fulfillment of any privileged requests from the second program module.

2. The computer-implemented method of claim 1, wherein the first program module and the second program module comprise computer-executable program instructions configured to cause two or more of the following operations:

compiling source code, testing compiled source code, packaging source code with other program data, testing packaged source code, publishing packaged source code to a production repository for subsequent deployment, or deploying published source code to make a software application available to one or more computing devices.

3. The computer-implemented method of claim 1, further comprising:

instantiating a first container and a second container within a runtime memory of the computer system, wherein the first program module is loaded into the first container, the second program module is loaded into the second container, and each container provides an isolated execution environment such that the first program module has no access to data loaded into the second container, and the second program module has no access to data loaded into the first container.

4. The computer-implemented method of claim 3, wherein passing the privileged credential to the first program module comprises:

retrieving the privileged credential from a credential store; and loading the privileged credential into the first container.

5. The computer-implemented method of claim 1, wherein the first program module comprises computer-executable code associated with building different software applications, and wherein the second program module comprises build code customized for a particular software application.

6. The computer-implemented method of claim 1, wherein validating the cryptographic signature of the first program module comprises:

obtaining a first cryptographic signature stored with the first program module in the trusted repository;

computing a second cryptographic signature using metadata of the first program module;

comparing the first cryptographic signature to the second cryptographic signature; and determining that the first program module is authentic based on the first cryptographic signature matching the second cryptographic signature.

7. The computer-implemented method of claim 6, wherein the first cryptographic signature and the second cryptographic signature are generated using a private key associated with the computer system, the first cryptographic signature being generated when the first program module is published to the trusted repository.

8. The computer-implemented method of claim 1, wherein the loading of the second program module further comprises:

validating, by the computer system, a cryptographic signature of the second program module to determine that the second program module is authentic.

9. The computer-implemented method of claim 8, wherein:

the cryptographic signature of the second program module is associated with publishing the second program module to a second repository separate from the trusted repository;

the second program module is scannable to verify that the second program module does not make privileged requests; and validating the cryptographic signature of the second program module indicates that the second program module has not been modified since being published to the second repository.

10. The computer-implemented method of claim 1, wherein:

the cryptographic signature of the first program module is associated with publishing the first program module to the trusted repository;

the first program module is reviewable to: (i) check a user or group identifier associated with the first program module against user permissions with respect to updating contents of the trusted repository, and (ii) confirm that usage of the privileged credential by the first program module does not pose a security risk to a production system where built software is stored; and validating the cryptographic signature of the first program module indicates that the first program module has not been modified since being published to the trusted repository.

11. A computer system comprising:

a trusted repository storing program modules that have been approved to make privileged requests using one or more privileged credentials; and one or more processors configured to:

obtain a set of build instructions calling for execution of a first program module stored in the trusted repository in addition to execution of a second program module not stored in the trusted repository;

load the first program module for execution, wherein to load the first program module, the one or more processors are configured to:

validate a cryptographic signature of the first program module to determine that the first program module is authentic, and pass a privileged credential to the first program module without providing the second program module access to the privileged credential, wherein the passing of the privileged credential is conditioned upon successful validation of the cryptographic signature; and load the second program module for execution, wherein to load the second program module, the one or more processors are configured to:

determine whether the second program module makes any privileged requests, and prevent fulfillment of any privileged requests from the second program module.

12. The computer system of claim 11, wherein the first program module and the second program module comprise computer-executable program instructions configured to cause two or more of the following operations:

compiling source code, testing compiled source code, packaging source code with other program data, testing packaged source code, publishing packaged source code to a production repository for subsequent deployment, or deploying published source code to make a software application available to one or more computing devices.

13. The computer system of claim 11, wherein the one or more processors are further configured to:

instantiate a first container and a second container within a runtime memory of the computer system, wherein the first program module is loaded into the first container, the second program module is loaded into the second container, and each container provides an isolated execution environment such that the first program module has no access to data loaded into the second container, and the second program module has no access to data loaded into the first container.

14. The computer system of claim 13, wherein to pass the privileged credential to the first program module, the one or more processors are configured to:

retrieve the privileged credential from a credential store; and load the privileged credential into the first container.

15. The computer system of claim 11, wherein the first program module comprises computer-executable code associated with building different software applications, and wherein the second program module comprises build code customized for a particular software application.

16. The computer system of claim 11, wherein to validate the cryptographic signature of the first program module, the one or more processors are configured to:

obtain a first cryptographic signature stored with the first program module in the trusted repository;

compute a second cryptographic signature using metadata of the first program module;

compare the first cryptographic signature to the second cryptographic signature; and determine that the first program module is authentic based on the first cryptographic signature matching the second cryptographic signature.

17. The computer system of claim 16, wherein the first cryptographic signature and the second cryptographic signature are generated using a private key associated with the computer system, the first cryptographic signature being generated when the first program module is published to the trusted repository.

18. The computer system of claim 11, wherein:

the one or more processors are further configured to validate a cryptographic signature of the second program module to determine that the second program module is authentic;

the cryptographic signature of the second program module is associated with publishing the second program module to a second repository separate from the trusted repository;

the second program module is scannable to verify that the second program module does not make privileged requests; and validating the cryptographic signature of the second program module indicates that the second program module has not been modified since being published to the second repository.

19. The computer system of claim 11, wherein:

the cryptographic signature of the first program module is associated with publishing the first program module to the trusted repository;

the first program module is reviewable to: (i) check a user or group identifier associated with the first program module against user permissions with respect to updating contents of the trusted repository, and (ii) confirm that usage of the privileged credential by the first program module does not pose a security risk to a production system where built software is stored; and validating the cryptographic signature of the first program module indicates that the first program module has not been modified since being published to the trusted repository.

20. A non-transitory computer-readable medium storing program code, the program code including instructions that are executable by one or more processors of a computer system to configure the computer system to:

obtain a set of build instructions calling for execution of a first program module stored in a trusted repository in addition to execution of a second program module not stored in the trusted repository, wherein the first program module and the second program module are executable to perform build operations for software under development, and wherein the trusted repository stores program modules that have been approved to make privileged requests using one or more privileged credentials;

load the first program module for execution, wherein the loading of the first program module comprises:

validating, by the computer system, a cryptographic signature of the first program module to determine that the first program module is authentic, and passing, by the computer system, a privileged credential to the first program module without providing the second program module access to the privileged credential, wherein the passing of the privileged credential is conditioned upon successful validation of the cryptographic signature; and load the second program module for execution, wherein the loading of the second program module comprises:

determining, by the computer system, whether the second program module makes any privileged requests, and preventing fulfillment of any privileged requests from the second program module.

* * * * *